(12) United States Patent
Healy et al.

(10) Patent No.: US 12,333,948 B2
(45) Date of Patent: Jun. 17, 2025

(54) SYSTEM FOR MANAGING REMOTE CALLS TO AN AIR TRAFFIC CONTROL FACILITY OR OTHER GROUND STATION VIA AN UNCREWED AIRCRAFT

(71) Applicant: Reliable Robotics Corporation, Mountain View, CA (US)

(72) Inventors: Chadwick Healy, Mountain View, CA (US); Michael Westenhaver, Mountain View, CA (US); John Folliard, Mountain View, CA (US); James Conrad, Mountain View, CA (US); Lewis Catton, Mountain View, CA (US); Casey Klebba, Seattle, WA (US)

(73) Assignee: RELIABLE ROBOTICS CORPORATION, Mountain View, CA (US)

( * ) Notice: Subject to any disclaimer, the term of this patent is extended or adjusted under 35 U.S.C. 154(b) by 285 days.

(21) Appl. No.: 17/948,154

(22) Filed: Sep. 19, 2022

(65) Prior Publication Data
US 2024/0096222 A1 Mar. 21, 2024

(51) Int. Cl.
G08G 5/26 (2025.01)
G08G 5/55 (2025.01)
G08G 5/57 (2025.01)

(52) U.S. Cl.
CPC ............... *G08G 5/26* (2025.01); *G08G 5/55* (2025.01); *G08G 5/57* (2025.01)

(58) Field of Classification Search
CPC ............ H04B 7/18506; H04B 7/18508; H04B 7/18502; H04B 7/15542; H04B 7/18517;
(Continued)

(56) References Cited

U.S. PATENT DOCUMENTS

| | | | |
|---|---|---|---|
| 8,155,641 B2 | 4/2012 | Hirsch | |
| 10,972,421 B2 | 4/2021 | Aster | |
| 2006/0046715 A1 | 3/2006 | Burgemeister | |
| 2015/0365159 A1* | 12/2015 | Bosworth | H04B 7/18504 455/11.1 |

(Continued)

FOREIGN PATENT DOCUMENTS

| | | |
|---|---|---|
| CN | 113938178 A | 1/2022 |
| KR | 101330991 B1 | 11/2013 |

OTHER PUBLICATIONS

International Search Report and Written Opinion issued Jan. 19, 2024 in corresponding application PCT/US2023/033169 filed Sep. 19, 2023.
(Continued)

*Primary Examiner* — Golam Sorowar
(74) *Attorney, Agent, or Firm* — Brownstein Hyatt Farber Schreck, LLP

(57) ABSTRACT

System and graphical user interface for managing communications between a remote terminal device operated by a remote pilot or other operator and an uncrewed aircraft. The communication system may include a satellite communication system or other relay communication system that is used to relay voice communication packets between the terminal device and the uncrewed aircraft. A computing system on board the uncrewed aircraft is configured to monitor an RF-communication channel between the uncrewed aircraft and an air traffic control (ATC) facility. In accordance with a state of the RF-communication channel and input provided at the remote terminal device, the computing system may transmit, buffer, delay, store, suppress transmission of, or delete voice communication messages generated by the remote pilot or operator at the terminal device.

18 Claims, 12 Drawing Sheets

(58) Field of Classification Search
CPC ............ H04B 7/18519; H04B 7/18532; H04B 7/18541; H04B 7/1855; H04B 7/18571; H04B 7/18584; H04B 7/18591; H04B 7/18504; H04B 7/1555; H04B 1/0003; H04B 1/0057; H04B 1/04; G08G 5/26; G08G 5/55; G08G 5/57; G08G 5/53; G08G 5/25; G08G 5/21; G08G 5/727; G08G 5/22; G08G 5/58; G08G 5/80; G08G 5/34; G08G 1/205; G08G 9/00; G08G 5/00; G08G 5/30; G08G 5/56; G08G 5/59; G08G 5/74; G08G 5/76; G08G 5/32; G08G 5/51; G08G 5/52; H04W 84/06; H04W 84/18; H04W 72/56; H04W 4/44; H04W 12/009; H04W 12/03; H04W 12/06; H04W 12/10; H04W 16/18; H04W 36/0055; H04W 36/08; H04W 36/083; H04W 40/24; H04W 72/0453; H04W 8/02; H04W 80/02; H04W 16/14; H04W 56/0005; H04W 56/0045; H04W 72/12

See application file for complete search history.

(56) References Cited

U.S. PATENT DOCUMENTS

| | | | |
|---|---|---|---|
| 2018/0157255 A1 | 6/2018 | Halverson et al. | |
| 2020/0258405 A1* | 8/2020 | Fern | G08G 5/22 |
| 2020/0259514 A1 | 8/2020 | Ruttler et al. | |
| 2022/0189316 A1* | 6/2022 | Paul | G05D 1/0022 |
| 2023/0208506 A1* | 6/2023 | Ji | G08G 5/26 |
| 2024/0405849 A1* | 12/2024 | Liu | H04W 4/44 |

OTHER PUBLICATIONS

Frew, E. and T.X. Brown, "Networking Issue For Small Unmanned Aircraft Systems" (2008) Unmanned Aircraft Systems K.P. Valavanis et al. (eds) 17 pages.

Hobbs, A., "Remotely Piloted Aircraft Systems" (2016) 27 pgs https://ntrs.nasa.gov/api/citations/20160014467/downloads/20160014467.pdf.

Vu, K.-P. L. et al., "Running Head: Impact of UAS Pilot Communication and Execution Latencies" (2014) 45 pgs https://ntrs.nasa.gov/api/citations/20190001064/downloads/20190001064.pdf.

* cited by examiner

SYSTEM FOR MANAGING REMOTE CALLS TO AN AIR TRAFFIC CONTROL FACILITY OR OTHER GROUND STATION VIA AN UNCREWED AIRCRAFT

TECHNICAL FIELD

The present disclosure is generally directed to a system for managing communications between a remote pilot or other type of remote operator and an air traffic control or other ground station and, more specifically, for processing remote calls using an on-board computing system for managing latency caused by satellite and other link communication schemes.

BACKGROUND

Traditionally, communications between an aircraft pilot and an air traffic control facility is performed over a designated radio-frequency communication channel. Multiple pilots may share a common communication channel with the air traffic control facility using traditional communication protocols. With the advent of uncrewed aircraft (traditionally referred to as unmanned aircraft), pilots or other persons operating the aircraft may be located remote from the aircraft, which increases the complexity of conducting pilot to air traffic control communications. For systems that include the use of a satellite link, significant communication latency may be introduced between the remote pilot and the air traffic controller. The systems and techniques described herein may be used to mitigate effects of latency created by satellite link communication schemes or other remote communication link systems.

SUMMARY

Example embodiments described herein are directed to a system and graphical user interface for managing communications between a remote terminal device operated by a remote pilot or other operator and an uncrewed aircraft. The communication system includes a satellite-based or other relay communication system that may be used to relay voice communication packets between the terminal device and the uncrewed aircraft. A computing system on board the uncrewed aircraft is configured to monitor a radio-frequency communication channel between the uncrewed aircraft and an air traffic control (ATC) facility. In accordance with a state of the RF-communication channel and input provided at the remote terminal device, the computing system may transmit, buffer, delay, store, or delete voice communication messages generated by the remote pilot or other operator at the terminal device.

A method may include, at a computing system comprising a processor and memory, operations for managing communications between a remote pilot or other operator of an uncrewed aircraft and a controller at an ATC facility including any of the operations or processes described herein.

A non-transitory computer readable storage medium may store one or more programs, the one or more programs comprising instructions, which when executed by an electronic device, cause the electronic device to perform any of the methods described herein.

A computer system may include one or more processors, memory, and one or more programs stored in the memory and configured to be executed by the one or more processors and including instructions for performing any of the methods described herein.

Figure 1:
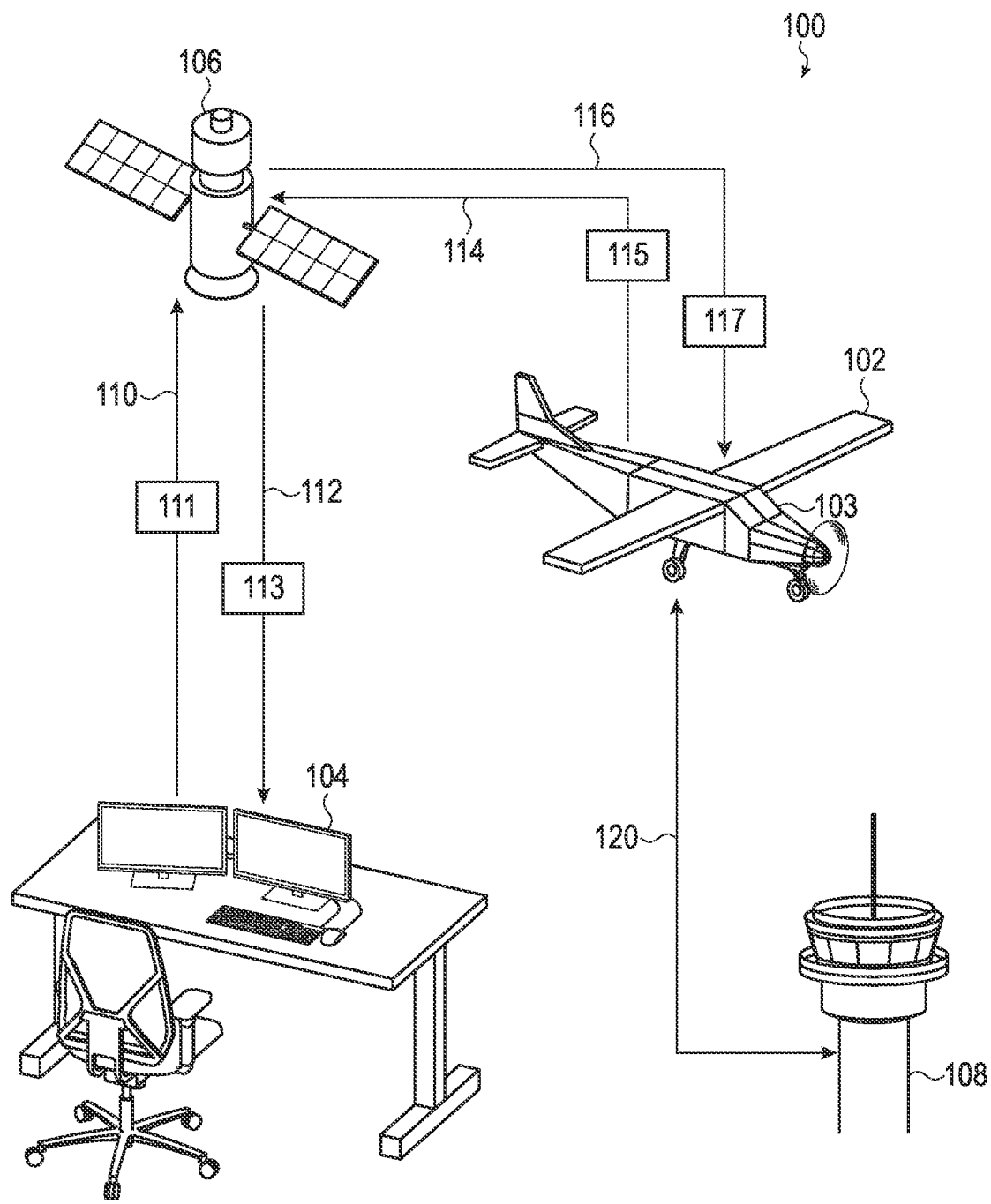
FIG. 1 depicts an example system with an uncrewed aircraft and a terminal device operated by an operator.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally directed to systems and methods for managing communications and controls for an uncrewed aircraft. Specifically, the examples and techniques described herein can be used to mitigate potential communication issues caused by latencies in a satellite-dependent communication system or other type of relay communication system. The examples and techniques described herein may allow for an uncrewed aircraft to conduct communications with an air traffic control (ATC) facility or other ground station in a way that may be comparable to communications performed by traditional crewed aircraft. The embodiments described herein may also provide an enhanced user interface for managing voice-based communications for the uncrewed aircraft. While some of the examples described herein are directed to particular communication systems and communication configurations, the proposed systems and methods are not limited to the specific examples described herein.

Typically, a pilot is able to conduct voice-based communications with a controller at an air traffic control facility when the aircraft is in a controlled airspace or other geographically defined region with respect to a particular air traffic control sector. Effective and accurate communication is important to ensuring the safety and efficiency of air traffic management around airports and other potentially busy airspace. In conjunction with voice-based communications, the aircraft and air traffic control may use radar, global positioning systems, ground-based navigational aids, instrumentation, transponders, IFF devices (identification friend or foe device) or other remote identification equipment, and other techniques to track and report current aircraft positions or conditions. The controller at the ATC facility typically provides instructions or commands to the aircraft on the ground or in the respective airspace to ensure safe operations.

Voice communications between an aircraft and an air traffic controller are typically conducted using one of a number of designated radio-frequency (RF) communication channels, which may be shared between the ATC facility and multiple aircraft. Pilots of individual aircraft use the RF-communication channel to initiate communications with ATC or to answer commands or instructions provided by ATC. Because the channel may be shared between ATC and multiple aircraft, each pilot should wait until the channel is quiet or the channel is "open" before initiating a voice communication.

While shared-channel management may be fairly straightforward using traditional aircraft-initiated communications, channel management may become more difficult using systems that use a satellite or other remote system to relay communications. This is particularly true for uncrewed aircraft in which the pilot or aircraft operator is located at a terminal device that is remote from the uncrewed aircraft. As described in more detail below, a remote pilot or other operator may use a satellite system or satellite communication link to relay voice communications to the uncrewed aircraft. In some cases, a satellite system may introduce a delay ranging from 10 msec to 3000 msec or more between the terminal device and the uncrewed aircraft. For the remote pilot monitoring communications at the terminal device, the effect of the latency may be doubled as the remote pilot may experience a first delay for a voice transmission and a second delay for the response from the aircraft, which may result in an effective latency ranging from 20 msec to 6000 msec or more.

In order to conduct effective two-way communications over an RF-communication channel with ATC, delays greater than 250 msec have been found to contribute to potential communication issues. In particular, a significant latency in the system may cause the remote pilot to initiate a voice communication when the RF-communication channel is not open resulting in overlapping or disrupted voice communications. This can lead to missed communication, unintelligible communication, or other potential problems for operators using the RF-communication channel.

The systems and techniques described herein may be used to mitigate potential issues that may be caused by latency in a communications system. In particular, an on-board communication management system may be implemented using an on-board computer or on-board computing system of the uncrewed aircraft to control the transmission of voice communications initiated by an operator of a terminal device, which may include a remote pilot or other type of user. The proposed system may allow the uncrewed aircraft to conduct two-way communications with an ATC controller in a way that consistent with existing pilot-controller communication protocols and operations.

As described herein, the on-board computing system of the uncrewed aircraft may be configured to receive a voice communication packet from a satellite system. The voice communication packet is generated in response to a voice input at a terrestrial-based terminal device and may include a voice call intended for communication to the ATC controller. The on-board computing system may temporarily store the voice communication packet as an aircraft-based communication message. The on-board computing system may monitor an RF-communication channel between a transceiver of the uncrewed aircraft and an ATC facility or transceiver. In response to the on-board computing system detecting an open condition on the RF-communication channel, the aircraft-based communication message may be automatically and immediately converted to an input signal to the on-board RF-transceiver thereby producing an RF transmission on the RF-communication channel. In response to the on-board computing system detecting a current voice communication or other signal on the RF-communication channel, the on-board computing system may suppress/hold transmission or introduce a predetermined delay before causing the RF transmission to be broadcast.

While some examples, provided herein are directed to a system that includes a satellite communication system, the same or similar techniques may be used for other non-satellite systems. For example, the systems and techniques described herein may be applied to communication systems that use ground-based communication systems including internet-enabled telephone systems or other networked computer systems. Generally, the techniques described herein can be applied to a variety of remote communication systems that includes both or either satellite- or non-satellite-based communication systems. Additionally, while some of the examples provided herein are directed to communications between an uncrewed aircraft and ATC, similar techniques can be used to manage communications between the uncrewed aircraft and other ground-based operators like, dispatch centers, or other ground-based operations. Additionally or alternatively, the techniques may be used to manage communications between the uncrewed aircraft and other aircraft or entities communicating on a shared RF-communication channel.

As described herein, the system may be configured to generate a graphical user interface for the terminal device that can be used to manage communications between the terminal device and ATC. Specifically, the graphical user interface may be used to monitor incoming and outgoing voice communications, activity on the RF-communication channel, and other elements of the system. The graphical user interface may provide feedback on the status of various aspects of the system, including estimated voice communication latency, communication channel status, voice message buffer, and other operational conditions of the system. The graphical user interface may also provide functionality for recording voice input, managing a voice message buffer, or controlling other aspects of the system. In some cases, the graphical user interface is integrated with an aircraft control graphical interface or software application operating on the terminal device.

The following examples and embodiments are described with respect to a system for remote communication and operation of an uncrewed aircraft. However, similar systems and techniques may be used to perform remote communication and operation of other types of vessels including, watercraft or land-based vehicles. For example, the following systems and techniques may be used to conduct remote operation and communication with watercraft and a station or facility associated with a harbor, channel, bay, or other body of water. The following systems and techniques may also be applied to land-based vehicles and a ground-based station or facility as part of a firefighting operation, construction project, or other ground-based operations.

These and other aspects of the system are described below with respect to the example embodiments depicted in FIGS. 1-7.

FIG. 1 depicts an example system with an uncrewed aircraft and a terminal device operated by a remote pilot or other operator. Specifically, FIG. 1 depicts a system 100 that includes an uncrewed aircraft 102 that may be remotely piloted or remotely monitored or controlled by a terminal device 104. The terminal device may also be referred to as a remote terminal, remote control station, ground-based controller, ground-based facility, or simply a controller. Communications between the terminal device 104 and the uncrewed aircraft 102 may be managed by a satellite communication system 106 or other type of relay communication system. The uncrewed aircraft 102, when in certain geographic and/or flight conditions, may communicate with an air traffic control (ATC) facility 108.

As described herein, a satellite-based or satellite-enabled communication scheme may provide several advantages including the ability to operate the uncrewed aircraft 102 over a potentially large geographical area, which may include regions that are remote from traditional (non-satellite) wireless communication schemes. The satellite-enabled communication scheme may also provide more consistent and reliable communication links that are relatively unaffected by geographic topology, weather, and other factors that may interfere with traditional (non-satellite) wireless communication schemes. However, one potential drawback to using a satellite for relayed communications is that the system may experience inherent and sometimes variable latency. As discussed previously, when conducting voice communications on a shared RF-communication channel 120 between an uncrewed aircraft 102 and an ATC facility 108, high-latency may cause interrupted, overlapping, or colliding voice communications with the ATC controller or with other pilots using the shared RF-communication channel. The systems and techniques described herein can be used to mitigate potential issues that may result from a system 100, as depicted in FIG. 1.

As described herein, the uncrewed aircraft 102 may be an airplane, rotorcraft, powered lift, glider, lighter than air craft, or other current or future category of aircraft. The uncrewed aircraft 102 may be adapted for cargo or non-passenger service or, alternatively, may be adapted to carry one or more human passengers or both human and cargo service. While the following examples are directed to an uncrewed aircraft that is both able to be remotely operated and also adapted for manual flight by a human pilot, the same or similar techniques may be applied to other types of aircraft including without limitation, remote-controlled aircraft systems or drones that do not have a remote pilot or operator. All of these example aircraft may be generally referred to as uncrewed/unmanned aerial vehicles (UAVs). The uncrewed aircraft 102 may be configured for (or may be modified or retrofitted to enable) fully autonomous, semi-autonomous, and/or manually-operated flight modes, and may be configured for uncrewed flight, remotely operated or monitored flight, or crewed flight. The system used to operate the UAV including, for example, remote pilot station, ground systems, and the UAV itself may be generally referred to as a uncrewed/unmanned aircraft system (UAS)

In the present example, the uncrewed aircraft 102 is a fixed wing powered airplane having flight controls that may allow a pilot to manually fly the aircraft. The uncrewed aircraft 102 has also been adapted for uncrewed flight in which an on-board pilot is not required. The uncrewed aircraft 102 is equipped with an on-board computing system 103 and controls that are configured to operate the propulsion system and various flight control surfaces of the uncrewed aircraft 102 such as ailerons, an elevator, a rudder, flaps, spoilers, slats, and air brakes. The on-board computing system 103 may also be configured to control the aircraft propulsion system including, without limitation, piston propeller engines, turboprop engines, turbojet engines, turbofan engines, or ramjet engines. The on-board computing system 103 may also be adapted to control ground or land-based operations including taxiing, parking, and other pre-flight and post-flight maneuvers as well as operate various subsystems including, for example, an auxiliary power unit, cabin environmental controls, fuel system controls, anti-icing equipment, and security systems.

The on-board computing system 103 may control the various systems of the aircraft either through motorized or adapted versions of human operated controls, through dedicated control mechanisms, or a combination of the two. In some cases, the uncrewed aircraft 102 is equipped with redundant electro-mechanical systems for each control operation and may include various other systems to ensure safe and reliable operation of the aircraft. The on-board computing system 103 may also be operably coupled to various sensors including, without limitation, airspeed sensors, temperature sensors, altimeters, global positioning system (GPS) sensors, accelerometers, tilt sensors, radar sensors, LiDAR sensors, and cameras.

Each of the subsystems operated on board the uncrewed aircraft 102 may be relayed to the terminal device 104 by one or more communication channels or systems. In the present example, the uncrewed aircraft 102 relays signals to the terminal device 104 via a satellite communication system 106. Specifically, data may be transmitted from the uncrewed aircraft 102 to the satellite communication system 106 via an uplink channel 114, which may transmit uplink data packets 115. Similarly data may be received from the satellite communication system 106 via a downlink channel 116, which may transmit downlink data packets 117. The uplink channel 114 and downlink channel 116 may be operated by an on-board transceiver configured to conduct wireless communications with the satellite using an established procedure and frequency band. In some cases, the uplink channel 114 and downlink channel 116 are operated over a common or shared network layer, data link layer, and/or physical communication layer. The transceiver may be adapted to conduct Ka-band communications (26-40 GHz), Ku-band communications (12-18 GHz), X-band communications (8-12 GHz), C-band communications (4-8 GHz), S-band communications (2-4 GHz), L-band communications (1-2 GHz), or other established communication bands.

Similarly, the terminal device 104 may conduct communications with the satellite communication system 106 through an uplink channel 110, which may transmit uplink data packets 111 and a downlink channel 112, which may transmit downlink data packets 113. Similar to the aircraft-side of the satellite communication scheme, the uplink channel and downlink channel may operate over a shared network layer, data link layer, and/or physical communication layer. The terminal device 104 may be operably coupled to a wireless transceiver configured to conduct wireless communications directly with a satellite of the satellite communication system 106. Alternatively, the terminal device 104 may be coupled to the satellite system via a satellite service provider that is operably coupled to the terminal device 104 over a computer network like the internet. For purposes of the current examples and explanation, the satellite communication system 106 may include a terrestrial transmission station, which may be operated by the terminal device 104 or by a third party.

The data communication packets 111, 113, 115, 117 may be generated in accordance with an established communications protocol. For example, the data communication packets 111, 113, 115, 117 may be generated in accordance with a Real-time Transport Protocol (RTP), which may include Real Time Communications (RTC) such as WebRTC protocols enabled through a web browser, Real-Time Messaging Protocols (RTMP), Real-Time Streaming Protocols (RTSP), and other similar protocols. Other protocols may include HTTP live streaming (HLS) protocols like Low Latency HLS or other similar streaming communication schemes. These and other protocols may also be broadly characterized as Voice Over Internet Protocol (VOIP) in which analog voice communications are converted to digital data objects (e.g., data communication packets 111, 113, 115, 117) and transported via an Internet Protocol (IP) communication system. While framed or packeted communication schemes may be used, it is not necessary to use either framed or IP communication schemes for the data communication packets 111, 113, 115, 117.

The system 100 may utilize the same communication channels (uplink channels 110, 114 and downlink channels 112, 116) for transmitting flight control information, sensor readings, images, video feeds, or perform other data exchanges between the terminal device 104 and the uncrewed aircraft 102. In some cases, some or all of these data exchanges are performed on a separate communication channel that is routed through the satellite communication system 106. If the uncrewed aircraft is predicted to be in reliable communication using another wireless communication network, some or all of the above-referenced data exchanges or voice communications may be, at least temporarily, conducted through another non-satellite wireless communication network.

As discussed previously, one advantage to using a satellite-based communication scheme or system 100 depicted in FIG. 1 is that reliable operation of the uncrewed aircraft 102 may be provided largely independent of geographic topology or ground conditions that could otherwise interfere with other ground-based communication schemes. The system 100 also enables the terminal device 104 and remote pilot or operator to be located very remote from the uncrewed aircraft 102 with little or no degradation in the system performance. However, as also described previously, the system 100 may introduce an inherent latency in voice communications that are relayed through the various uplinks and downlinks required for the satellite communication system 106. In some implementations, an uplink 110 and downlink 116 pair of communication operations may introduce a delay ranging from 10 msec to 3000 msec or more between the terminal device 104 and the uncrewed aircraft 102. In order for the operator of the terminal device 104 to monitor a result of a communication, the effect of the latency may be doubled as the return signal or feedback must travel through another uplink 114 and downlink 112 pair as the data is transmitted back from the uncrewed aircraft 102 to the terminal device 104. Thus, a round trip communication operation may result in an effective latency ranging from 20 msec to 6000 msec or more.

As discussed previously, the system 100 of FIG. 1 may alternatively include a non-satellite communication system that also produces a latency in communication systems and, thus, may use the systems and techniques described herein. Generally, the depicted satellite communication system 106 may represent a more general remote communication system that includes both or either satellite- or non-satellite-based communication systems. Specifically, element 106 may represent a more general relay communication system that includes primarily ground-based communication hardware and is adapted to communicate with the uncrewed aircraft 102 using a non-satellite wireless communication system.

Figure 2:
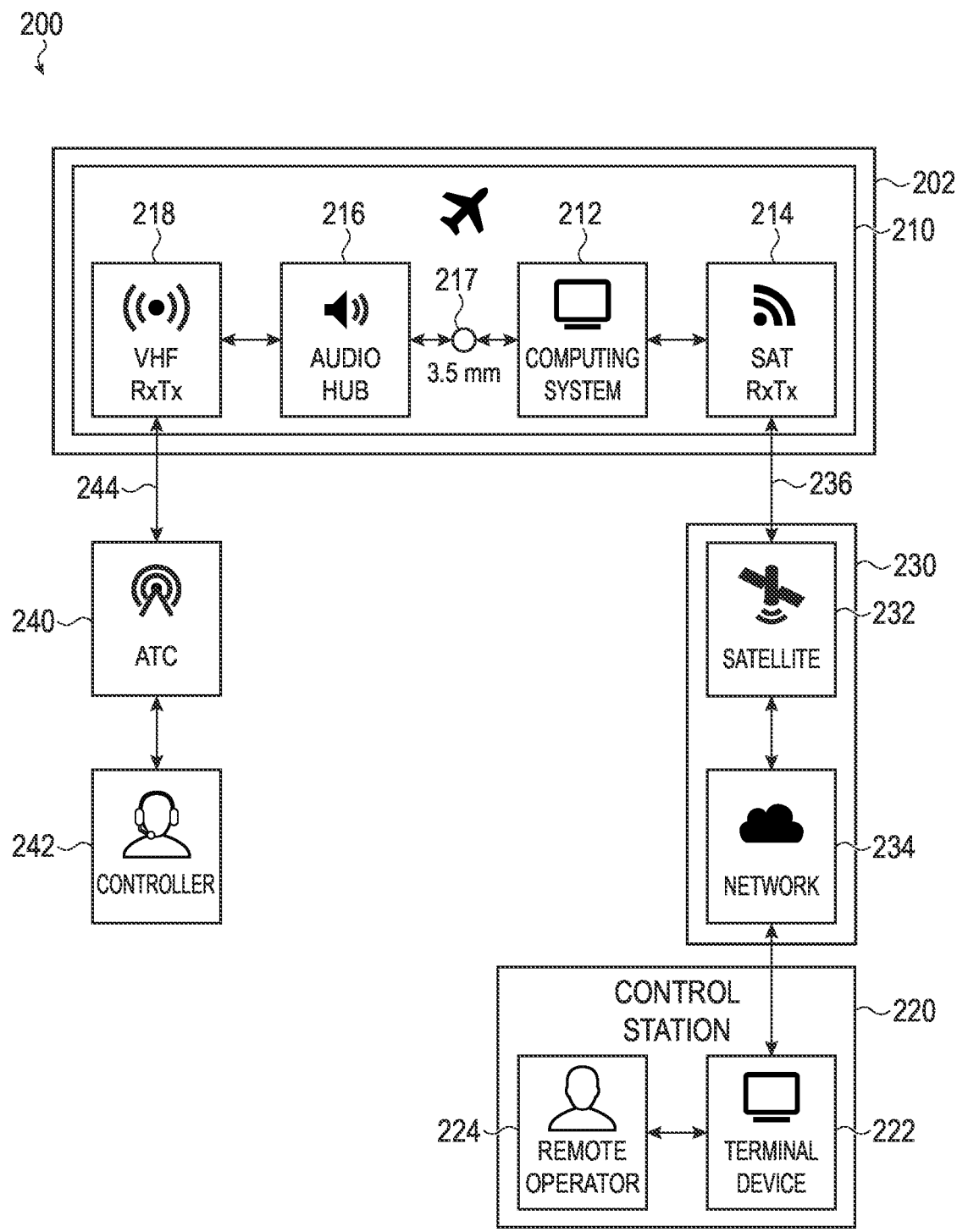
FIG. 2 depicts an example communication system for an uncrewed aircraft.

The system 200 of FIG. 2 and, in particular, the operation of an on-board computing system to monitor and control voice communications, may mitigate the effects of latency induced by the satellite communication scheme. In particular, an on-board communication system 210 of an uncrewed aircraft 202, may be used to manage communications between a remote pilot 224 or other operator using a terminal device 222 at a terrestrial control station 220 and a controller 242 or other operator at an Air Traffic Control (ATC) facility 240.

As shown in FIG. 2, the on-board communication system 210 includes a first transceiver 214 that is configured to receive wireless communications from a satellite communication system 230. The satellite communication system 230 may include one or more satellites 232 and a network 234, which may include the internet, a ground station, or other terrestrial components. As described above, the first transceiver 214 may be configured to receive voice communication packets from the satellite communication system 230 via a satellite-enabled communication channel 236 (e.g., a downlink channel). The voice communication packets are digital communication packets that may be encoded in accordance with a VOIP, RTC, or HTTP communication protocol, as described above with regard to FIG. 1. Also, similar to as described above with respect to FIG. 1, the first transceiver 214 may be adapted to handle other data exchange operations with the terminal device 222 via a shared communication channel 236 or a separate or dedicated communication channel established with the satellite communication system 230.

Figure 7:
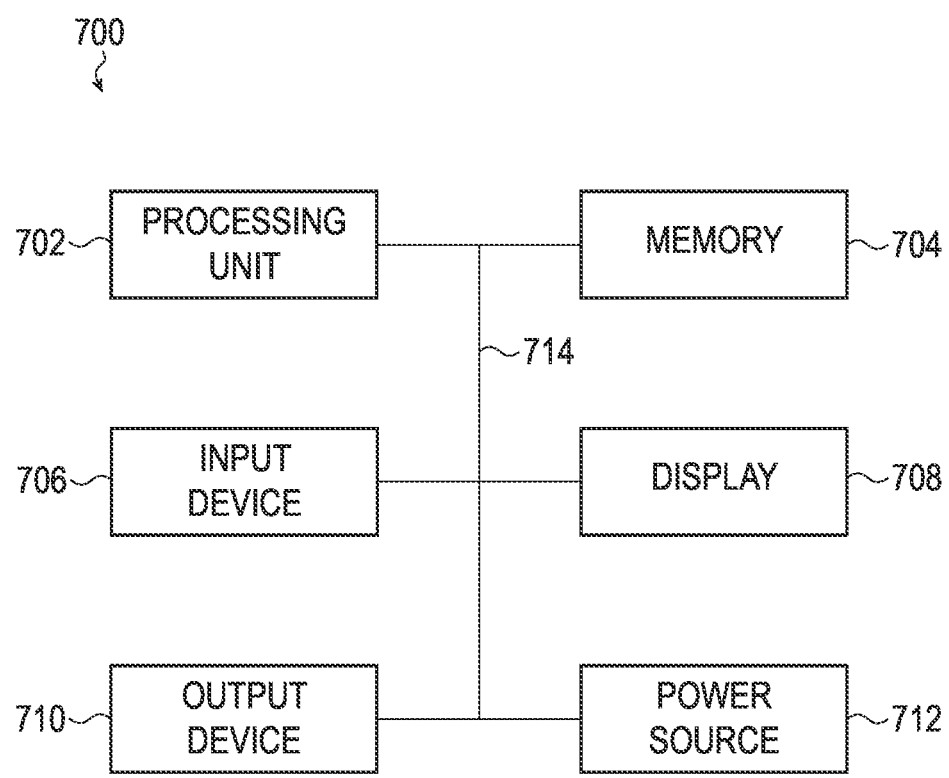
FIG. 7 depicts an example electronic device.

In response to receiving one or more voice communication packets from the satellite communication system 230, the computing system 212 may store an aircraft-based communication message that is formulated in accordance with the one or more voice communication packets. The aircraft-based communication message may be stored as a Waveform Audio File Format (way file), .mp3, m4a, .aac, Audio Interchange File Format (AIFF) .mp3, or other type of audio file in the computer memory of the computing system 212. FIG. 7, described below, provides example computer memory devices that may be used in the computing system 212.

Figure 4:
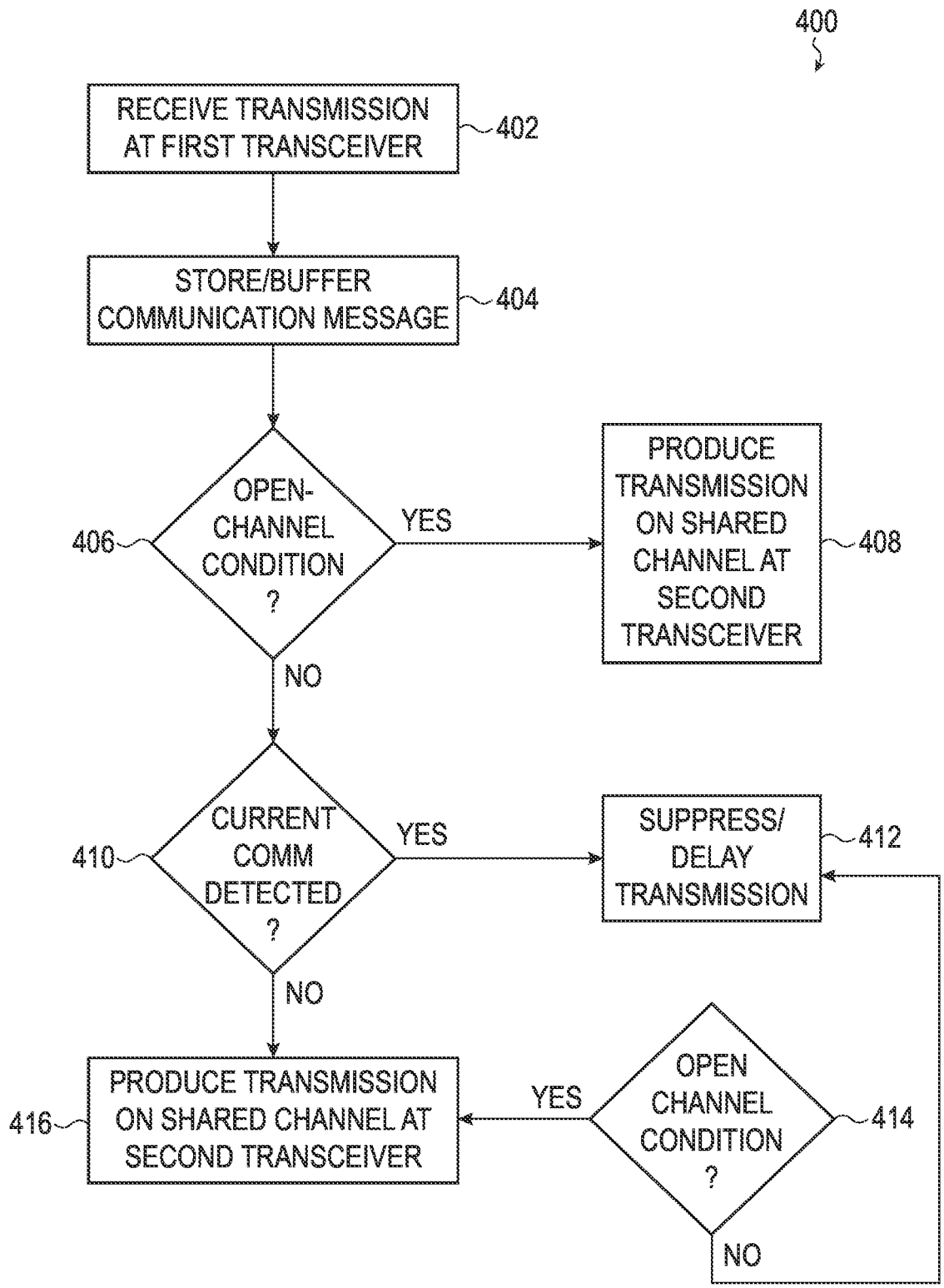
FIG. 4 depicts a flow chart of an example process for managing communications for an uncrewed aircraft.

As described previously, the on-board communication system 210 may delay transmission of a corresponding RF-based communication depending on one or more conditions, which are described in more detail with regard to the process 400 of FIG. 4. For example, in response to detecting a current communication message being broadcast on the RF-communication channel 244, the computing system 212 may delay or suppress transmission of an RF-based communication corresponding to the aircraft-based communication message. Further, in response to detecting an open or quiet condition on the RF-communication channel 244, the computing system 212 may immediately and automatically cause transmission of the RF-based communication corresponding to the aircraft-based communication message. In some cases, the aircraft-based communication message may only be momentarily stored in computer memory before being converted to a signal used to generate the RF-based communication.

As shown in FIG. 2, the computing system 212 is operably coupled to an audio hub 216 via an audio interface port 217. The computing system 212 may include digital-toanalog circuitry such as a digital signal processing (DSP) circuitry that is adapted to convert the (digital) aircraft communication message into an analog audio signal communicated via the audio interface port. The computing system 212 may also include analog-to-digital circuitry to enable (analog) audio signals received from the audio hub 216 (generated in response to a received RF communication on the RF-communication channel 244 from the ATC facility 240 or other entity) to be converted into digital audio files, which may be stored or used to generate uplink communication packets for transmission to the terminal device 222 via the satellite communication system 230. Thus, the on-board communication system 210 may be used to manage two-way communications between the ATC facility 240 and the remote pilot 224 or other operator at the terminal device 222.

The audio hub 216 may include one or more amplifier and/or signal conditioning elements required for generating an RF-based communication using the second transceiver 218. The audio hub 216 may also include signal generation circuitry adapted to change RF channels, encode RF communications, or provide other RF-communication operations necessary for communicating with the ATC facility 240 or other entities. The audio interface port 217 may include a standard 3.5 mm audio jack or other audio interface connection. In this example, the audio interface port 217 is configured to receive an analog audio signal from the computing system 212. In other implementations, the audio interface port 217 may be configured to receive a digital signal, which may be converted into an analog communication by the audio hub 216

The radio frequency and operational parameters of the RF-communication channel 244 may be determined by the particular ATC facility 240 and may vary depending on the amount of expected air traffic that the ATC facility 240 is adapted to handle. The RF-communication channel 244 may be broadly described as a VHF channel that is shared between the ATC facility 240 and any aircraft that are within a specified region or geographic boundary with respect to the ATC facility 240. In some cases, the RF-communication channel 244 may be adapted for universal communications (UNICOM) and may be operating at one of a number of predefined frequencies. Typically, UNICOM channels used by large airports in the U.S. operate on a 122.950 MHz frequency band. Other airports may have ATC that operate on 122.700 MHz, 122.725 MHz, 122.800 MHz, 122.975 MHz, 123.0-00 MHz, 123.050 MHz, 123.075 MHz, or other frequency band. The UNICOM channel frequency bands and operational parameters may also vary by country, region, or other factor. The ATC facility 240 may operate one or more Voice Communication Control Systems (VCCS) that are able to manage channel coupling, ground telecom links, telephone patching, and other functionality.

The audio hub 216 may be adapted to adjust operation of the transceiver 218 to accommodate the communication scheme specified by the ATC facility 240. In particular, as the uncrewed aircraft 202 approaches airspace controlled by or associated with the ATC facility 240, the audio hub 216 may be configured to adjust transmission frequency and other operational parameters in accordance with channel specifications provided by the ATC facility 240 or from a reference stored by the computing system 212. In some implementations, the operational parameters of the audio hub 216 are controlled by the computing system 212, which may be operably coupled to the audio hub 216 via the interface 217 or another similar interface that is dedicated to control and feedback operations.

The computing system 212, in addition to managing the voice communications with ATC, may be adapted to provide other data to the terminal device 222 via satellite communication system 230. For example, the computing system 212 may be operably coupled to on-board sensors, aircraft instrumentation, GPS devices, cameras, videos, or other similar on-board devices able to sense environmental conditions or operational states of the uncrewed aircraft 202. As described previously, the computing system 212 may be adapted to store or log acquired data and relay the data to the terminal device 222 via the satellite communication system 230. Similarly, the computing system 212 may be adapted to implement or execute operational commands or instructions received from the terminal device 222 via the satellite communication system 230.

In some cases, the computing system 212 is similar in configuration to the terminal device 222. For example, both the computing system 212 and the terminal device 222 may have similar hardware components, described in more detail below with respect to FIG. 7. Both the computing system 212 and terminal device 222 may operate or execute client applications that are configured to manage communication and operations between the terminal device 222 and the computing system 212. In some cases, the client applications are different but are configured to operate in tandem as part of an aircraft control system.

Figure 3A:
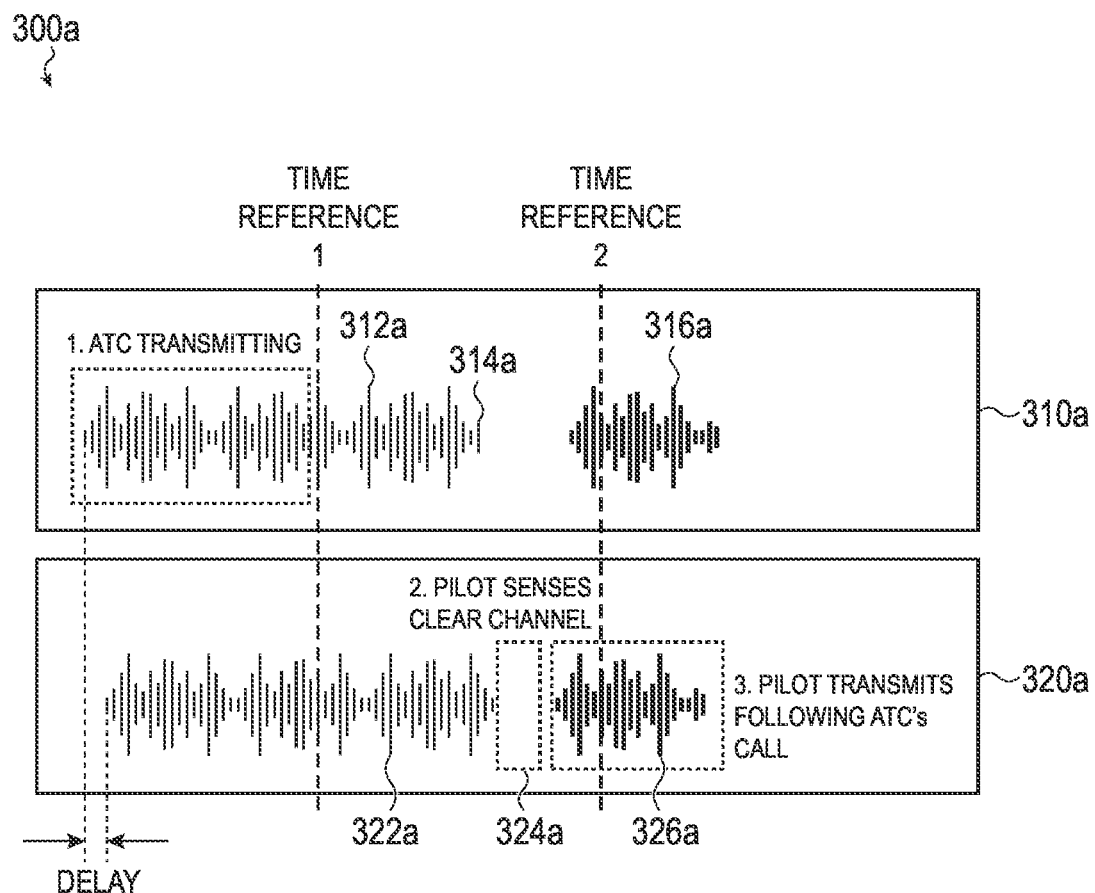
FIGS. 3A-3C depict example communication transmissions over an RF-communication channel.
Figure 3B:
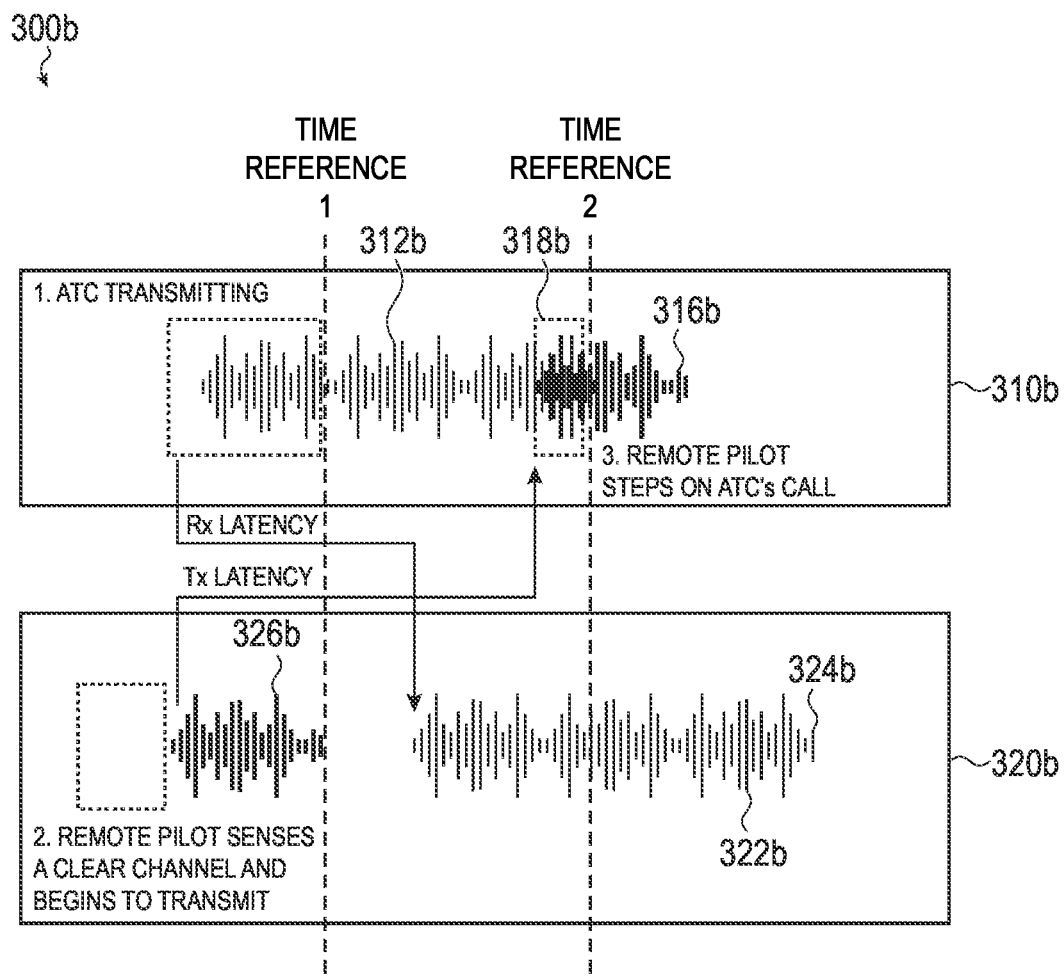
Figure 3C:
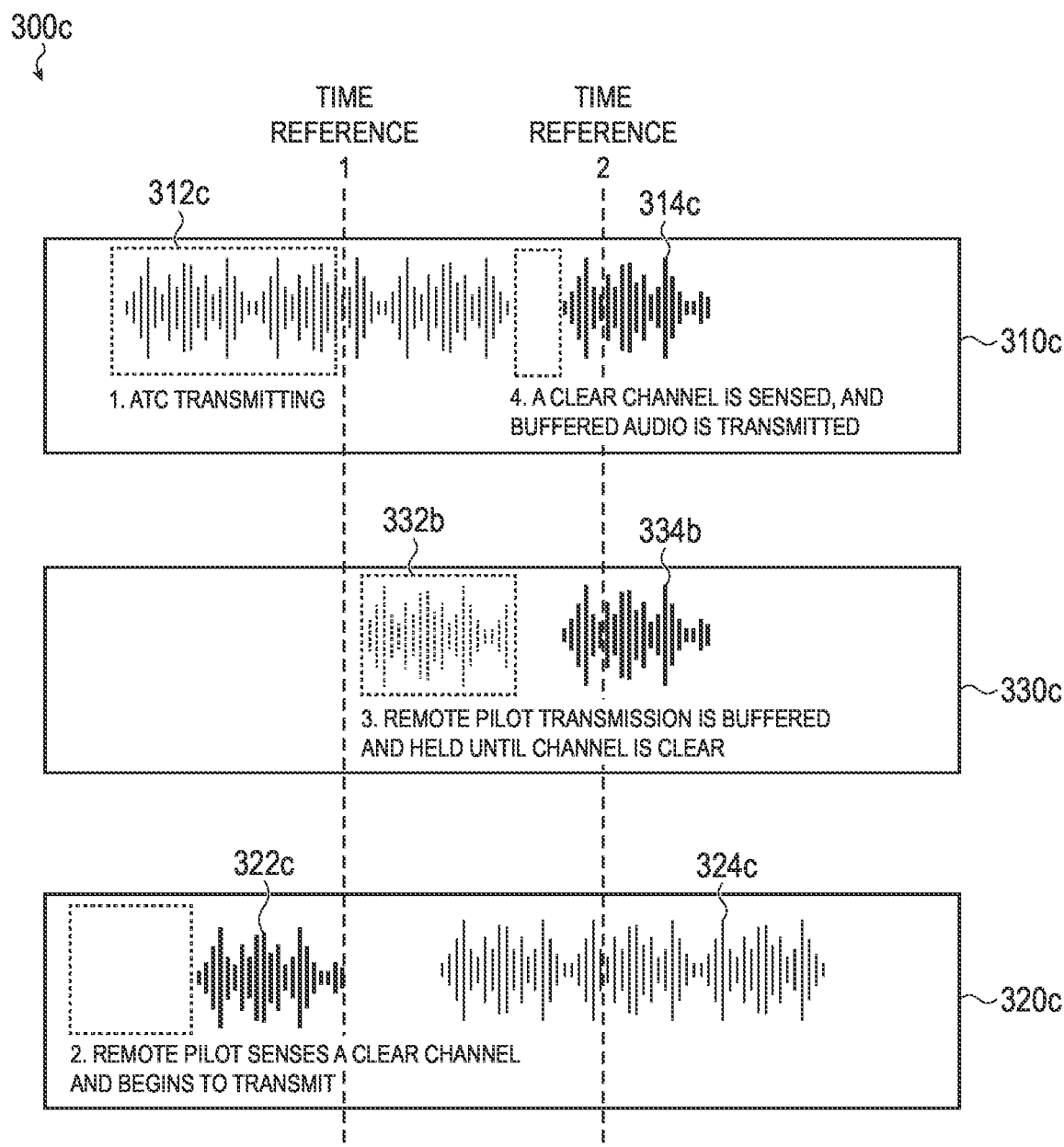

As discussed previously, using a satellite communication system provides many advantages for remote control of the uncrewed aircraft. However, inherent latency created by the satellite relay may cause potential issues when conducting voice communications originating from the terminal device or other terrestrial source. FIGS. 3A-3C depict example communication schemes as experienced by the various elements of an example communications system. The system of FIGS. 3A-3C may be similar to the systems 100 and 200 described above with respect to FIGS. 1 and 2 and referenced elements correspond to similarly named elements described with respect to the previous examples.

FIG. 3A depicts a system in which normal or low latency communication delays are present. For example, a normal or low latency communication delay may be characterized as a one-way delay ranging from 0 to approximately 400 msec. In practice, low latency (non-satellite) communication systems may have one-way delays ranging from 200 msec to 390 msec. In these latency conditions the risk of overlapping, interrupting, or colliding transmissions on a shared RF-communication channel are low and considered acceptable given traditional ATC to pilot communication procedures. That is, ATC controllers and trained pilots are accustomed to this level of delay and have developed a call and response cadence that accounts for delays within this range.

As shown in FIG. 3A, signal sequence 310a represents signals carried on the RF-communication channel as perceived or experienced by the ATC facility (or another pilot using the RF-communication channel). Signal sequence 320a represents the signals perceived by either a pilot located within the aircraft or a remote pilot experiencing hypothetically low transmission latencies. As shown in the signal sequence 310a, the ATC facility may produce an ATC transmission 312a at approximately reference time or occurrence 1. This transmission from the ATC facility is perceived by the pilot as transmission 322a in signal sequence 320a at a slight delay due to the low system latency of, for example, less than 250 msec. (While not drawn to scale, the latency depicted in FIG. 3A may be less than 50 msec.)

In the example of FIG. 3A, because the pilot is able to perceive the completion of the ATC transmission 324a at or near the same time as the ATC transmission is actually completed on the RF-communication channel, the pilot can begin a following call or pilot transmission 326a, which does not overlap or interfere with the ATC transmission 312a, as shown by the pilot call or the pilot transmission 316a on the signal sequence 310a at reference time or occurrence 2. Note that in a low latency system, the pilot perception of the end of the ATC transmission 324a is close enough to the actual end of the ATC transmission 312a that the dead or open air delay between the ATC transmission 312a and the pilot transmission 316a is a duration that corresponds to normal ATC to pilot exchanges. In some cases, the delay between transmissions is as low as 20-100 msec, but natural pauses in responses can exceed 3000 ms or more.

FIG. 3B depicts an example set of transmissions on a system that has what can be characterized as high-latency communications. High latency may correspond to a system experiencing latencies greater than or equal to approximately 390 msec. Similar to the previous example, the signal sequence 310b represents signals carried on the RF-communication channel as perceived or experienced by the ATC facility, and the signal sequence 320b represents the signals perceived by a remote pilot experiencing a relatively high latency condition. While not drawn to scale and potentially exaggerated for purposes of illustration, the latency condition of FIG. 3B may correspond to a total delay (Tx latency plus Rx latency) ranging from 400 msec to 4000 msec.

As illustrated in the example of FIG. 3B, the ATC may initiate an ATC transmission 312b at reference time or occurrence 1. However, due to the Rx latency in the system, the ATC transmission may not be perceived until approximately reference time 2 as shown in the perceived ATC transmission 322b. Due to this delay, the remote pilot may perceive an open or clear channel condition at reference time or occurrence 1 and initiate a pilot transmission 326b at reference time 1. In fact, the remote pilot may not perceive the end of the ATC transmission (perceived completion 324b) until well after the pilot has already initiated the pilot transmission 326b.

The pilot transmission is further delayed due to a Tx latency, which causes the pilot transmission to be broadcast on the RF-communication channel at approximately reference time or occurrence 2, as shown by pilot transmission 316b in signal sequence 310b. The combined effect of the system latencies results in an interference between the ATC transmission 312b and the pilot transmission 316b, as shown by interference region 318b. This may also be referred to as a "stepped on" call and may result in either a truncation of the ATC transmission 312b, a truncation of the pilot transmission 316b, garbled or incoherent transmission, or a period of no transmission, as some systems avoid stepped-on calls by suppressing interfering signals.

In accordance with the other embodiments described herein, the Tx latency of FIG. 3B may be caused, at least in part, by delays in the satellite uplink channel (from terminal device to satellite) in addition to delays in the satellite downlink channel (from the satellite to the uncrewed aircraft). Similarly, the Rx latency of FIG. 3B may be caused by the converse pair of delays in the satellite uplink channel (from uncrewed aircraft to satellite) in addition to delays in the downlink channel (from satellite to terminal device). While a substantial portion of the delay may be caused by the satellite uplink and downlink channels, additional delays may be caused by other elements in the system. As described above, these latencies or delays are an inherent product of a satellite-based communication scheme and may not be easily avoided.

FIG. 3C depicts an example sequence which may mitigate the risk of interfering or stepped on calls between ATC and the pilot of an uncrewed aircraft. In particular, through the use of an on-board computing system, delayed transmissions that would otherwise interfere with another transmission on the shared RF-transmission channel may be suppressed or further delayed until an open or clear channel condition is detected. The system latency in the example of FIG. 3C may be similar to the latency experienced in the example of FIG. 3B while avoiding the stepped on or interfering calls of that example.

Similar to the previous examples, an ATC transmission 312c is produced on the RF-communication channel, as illustrated in the signal sequence 310c at reference time or occurrence 1. Also at reference time or occurrence 1, a pilot transmission 322c is produced at the terminal device, as illustrated in the signal sequence 320c. Similar to the previous example, the remote pilot may produce the pilot transmission 322c at reference time or occurrence 1 because the channel appears to be clear, as perceived at the terminal device. While the transmission of the pilot communication may be delayed due to system latency, the communication is intercepted by the on-board computing system and stored in the computing system's memory. Signal 332b represents the approximate time at which the on-board computing system receives and stores or buffers the pilot transmission. Because the computing system detects a current communication or non-open channel condition on the RF-communication channel, the computing system may suppress or delay the transmission of the pilot transmission 334b until an open or clear channel condition is detected. As shown in the signal sequence 310c, the resulting pilot transmission 314c may be transmitted on the shared RF-communication channel at a time that is subsequent to the completion of the ATC transmission 312c. Further, the on-board computing system may introduce a delay period that mimics the natural quiet period between communications in a normal (low latency) communication scheme. In some cases, the delay period is greater than 50 msec. In some cases, the delay period is greater than 500 msec. In some cases, the delay period is greater than 1500 msec.

In some implementations, the delay that is introduced is determined, at least in part, by a spatial or geographical-based trigger or condition. For example, the transmission may be suppressed or paused until the aircraft travels a threshold distance or meets some other spatial trigger. The spatial trigger may be determined using a ground-based waypoint or signal, a GPS-determined waypoint or location, or other similar technique. The spatial or geographical-based trigger or condition may be used alone or in conjunction with a time-based delay criteria.

Thus, the proposed solution depicted in the example of FIG. 3C may be used to mitigate the effects of system latency and reduce or eliminate interfering or stepped on calls. Furthermore, by introducing the intermediate on-board computing system to manage communications with a remote pilot or operator, additional functionality may be provided. In particular, the communications of the remote pilot or operator may be decoupled from the current communications on the RF-communications channel, which may allow the remote pilot or operator to pre-record or develop a queue of communication calls, which may be distributed over time by the on-board computing system. The ability to queue communications, may also allow the pilot or operator to cancel communications before they appear on the RF-communication channel. This functionality and other aspects of the system are described in more detail below with respect to FIGS. 4-6H.

FIG. 4 depicts an example process 400 for managing communications between a remote pilot or other operator at a terminal device at an ATC facility having an established RF-communication channel between the ATC facility and a remote aircraft. The process 400 of FIG. 4 may be performed using one of the example systems 100, 200 described above with respect to FIGS. 1 and 2, respectively. In some implementations, all or some of the operations are performed by the on-board communication system having a computing system, as described above. Some operations are performed in response to actions performed by other elements of the system including, for example, the terminal device, the ATC controller, or the satellite communication system, as described herein.

At operation 402, a transmission is received at a first transceiver located on the uncrewed aircraft. The transmission is generated in response to a voice input provided at a remote terminal device operated by a remote pilot or other operator. As described herein, the transmission may be a digital communication received over a downlink channel from a satellite communication system. The digital communication may be a voice communication packet configured for wireless transmission between a terrestrial transmission station and a satellite of the satellite communication system. The voice communication packet may be configured in accordance with a media transmission protocol including, for example, an RTP, HLS, VOIP, or other digital protocol configured for use with audio media.

At operation 404, in response to receiving the transmission at operation 402, an aircraft-based communication message is stored or buffered in computer memory in the uncrewed aircraft. As described previously, the computing system of the on-board communication system may store or buffer a version of the transmission, either stored/buffered as a data object that corresponds to the voice communication packet, as it is received or as a data object stored as a different type of audio-formatted file. In either case, the aircraft-based communication message is stored as a digital representation of the original audio input received at the terminal device. The aircraft-based communication message may be stored or buffered in a format that can be transmitted to an internal digital-to-analog converter for output to an audio hub, which may be adapted for wireless communications with the ATC facility. As described previously, the wireless communication between the uncrewed aircraft and the ATC facility may be conducted using an RF-communication channel configured to carry a voice-communication feed. The RF-communication channel may be shared among multiple aircraft within a region or area that corresponds to the ATC facility.

In one implementation of operation 404, multiple copies of a voice communication packet are transmitted using the satellite communication system in order to provide redundancy and improve reliability of the system. For example, one or more redundant voice communication packets may be transmitted through the satellite communication system in response to a single message generated at the terminal device. When the multiple packets are received by the uncrewed aircraft, a comparison may be made between the packets and a packet predicted to be most accurate is the one that may be selected for use by the system. For example, using a comparison of hashed packets, non-matching or non-conforming packets may be eliminated. Packet sequencing or other addressing techniques may be used to identify and collect redundant packets. Additionally or alternatively, one or more redundant satellite communication channels may be established and the uncrewed aircraft may dynamically select the channel predicted to have the highest accuracy or reliability.

In operation 406, a determination is made regarding the state of the RF-communication channel. Specially, the on-board computing system may (through the audio hub or other device communicably coupled to the RF-communication channel) monitor a voice-communication feed on the RF-communication channel. Monitoring the RF-communication channel may be performed by obtaining one or more samples of the voice-communication feed of the RF-communication channel and analyzing the samples to determine the current state or condition of the channel. In operation 406, the computing system may analyze a portion of the voice communication feed and determine whether the current state of the channel corresponds with an open channel condition or quiet channel condition in which there is not currently a voice communication being broadcast on the RF-communication channel.

Operation 406 may be performed using one or more of the following techniques. Generally, the system may perform a predetermined signal analysis on a sampled portion of the RF-communication channel and, in response to the result of the analysis satisfying an open-channel criteria, detect the open-channel condition or quiet-channel condition. For example, monitoring the RF-communication channel, the system may detect an open-channel condition in response to a power level of a particular frequency satisfying a power threshold or other power criteria. In some cases, the system may detect an open-channel condition in response to a loudness condition, which corresponds to an amplitude or magnitude of a signal on the RF-communication channel. Loudness may be measured as a voltage or amplitude of a modulated signal or transmission on the RF-communication channel.

Additionally or alternatively, the system may detect an open-channel condition by performing a spectral analysis of a sample of the voice-communication feed and determining whether the spectral analysis corresponds to or satisfies an open-channel criteria. The open-channel criteria may reflect the static, white noise, or non-voice signal spectral characteristics of the RF-communication channel. In some cases, the analysis may be repeated for several sequential samples and an average of the results of the analysis is used to determine the condition or state of the channel. Other signal processing and analysis techniques may also be used to detect the open-channel or quiet-channel condition.

In some cases, the open-channel condition is detected by determining the end of a current voice transmission or absence of a recent voice transmission. For example, the system may receive a sample stream of the voice-communication feed at a designated time and may analyze the first sample stream to determine a spectral analysis. In response to the spectral analysis satisfying a first criterion corresponding to a detection of a voice pattern or a noise condition, the system may delay a monitoring of the voice-communication feed a predetermined time period or suppress transmission of the outgoing communication. In response to the spectral analysis satisfying a second criterion corresponding to an open-channel condition, the system may detect the completion of the current voice communication on the RF-communication channel or an absence of a recent voice communication.

In operation 408, in response to the system detecting an open-channel condition, the system may be configured to produce an RF transmission on the RF-communication channel using a second transceiver of the uncrewed aircraft. The second transceiver may be integrated with or operated in accordance with the audio hub, described above with respect to FIG. 2. The RF transmission is generated in accordance with the aircraft-based communication message that was buffered/stored by the on-board computing system generated in operation 404. As a result of operation 408, a message corresponding to the audio input provided by the remote pilot is produced on the RF-communication channel. In some implementations, a predetermined delay or pause is produced before transmitting the message. The predetermined delay or pause may be approximately 20 msec or longer, 50 msec or longer, 500 msec or longer, 1500 msec or longer, or 200 msec or longer.

In operation 410, a determination is made regarding the state of the RF-communication channel. similar to as described above with respect to operation 406, and the on-board computing system may monitor a voice-communication feed on the RF-communication channel. In operation 410, the computing system may analyze a portion of the voice communication feed and determine whether the current state of the channel corresponds with a busy channel condition in which a current voice communication is detected.

Operation 410 may be performed using one or more of the following techniques. Generally, the system may perform a predetermined signal analysis on a sampled portion of the RF-communication channel and in response to the result of the analysis satisfying a busy-channel condition in which a current voice communication is detected. For example, monitoring the RF-communication channel, the system may detect a current voice communication in response to a power level of a particular frequency satisfying a power threshold or other power criteria. Additionally or alternatively, the system may detect a current voice communication by performing a spectral analysis of a sample of the voice-communication feed and determining whether the spectral analysis corresponds to or satisfies a voice-detection criteria. The voice-detection criteria may reflect the signal spectral characteristics of the RF-communication channel when a human voice communication is being broadcast. The voice-detection criteria may reflect the signal spectral characteristics of the RF-communication channel when a voice pattern or noise condition is detected, which may correspond to an intentional communication on the RF-communication channel. In some cases, the analysis may be repeated for several sequential samples and an average of the results of the analysis is used to determine the condition or state of the channel. Other signal processing and analysis techniques may also be used to detect a busy-channel condition corresponding to a current voice communication. In some implementations, operations 406 and 410 are combined as a negative or "N" outcome of operation 406 may automatically satisfy the positive or "Y" outcome of operation 410. Thus, the two operations may be performed as a result of a single determination with respect to the RF-communication channel.

In operation 412, in response to detecting a busy-channel condition or a current voice communication in accordance with operation 410, transmission of the aircraft-based communication message over the RF-communication channel is suppressed or delayed. In some implementations, a transmission or broadcast of the message may be delayed in accordance with a predetermined time period. After the predetermined time period has lapsed, operation 414 may be performed and, in response to detecting an open-channel condition, the message may be transmitted on the RF-communication channel in accordance with operation 416. Operation 414 may be performed in accordance with the process described with respect to operation 406. Also, operation 416 is substantially similar to operation 408, described above. Operation 414 may be repeated to determine a new or updated state of the RF-communication channel. If the channel remains busy, one or more subsequent delay periods may be implemented until an open-condition or quiet-channel condition is detected as indicated by the 412/414 loop depicted in FIG. 4.

As an alternative to imposing or implementing a series of predetermined delay periods, an end of a current voice communication may be detected in response to a change in the signal received at the uncrewed aircraft. For example, a drop in power level greater than a predetermined threshold or a change in the spectral composition of the signal greater than a predetermined criteria may be used to detect a completion of the current voice communication. In some cases, a subsequent quiet period or open-channel condition must be also detected before causing transmission of the message on the RF-communication channel.

The operations of process 400 may be performed in accordance with traditional or standard ATC to pilot communication protocols. In many use cases, the process 400 is performed in response to an outbound message or command transmitted by the ATC controller or operator. The ATC controller may issue a command or instruction, which is answered and/or confirmed by, in this case, the remote pilot or other operator of the terminal device. Typical ATC communications may include aircraft routing instructions or traffic advisories. The ATC communication may also require the pilot to report current conditions of the aircraft, which may be obtained by the remote pilot using, for example, the graphical user interface 500 of FIG. 5A described below. The pilot may be required to report current location, airspeed, altitude, current waypoints, or other current aircraft or flight conditions.

Pilot-initiated communications may also be performed. For example, in accordance with some ATC protocols, pilots may provide an initial contact message identifying the name of the ATC facility being called, the name or call letters of the aircraft, and positional information of the aircraft, if required. The pilot may also check with ATC if a message has not been received in a long period of time or if the pilot wants to confirm that the aircraft is being currently tracked by ATC. A pilot-initiated transmission may also be produced in response to a sensed condition of the aircraft, as monitored by the terminal device. For example, a condition related to the safety of the aircraft or others may be automatically broadcast in response to a sensed condition. A low fuel condition or an equipment failure that is detected by the terminal device may be used to generate and transmit a pre-recorded message or prompt the operator at the terminal device to generate a custom message to address the detected condition.

Figure 5A:
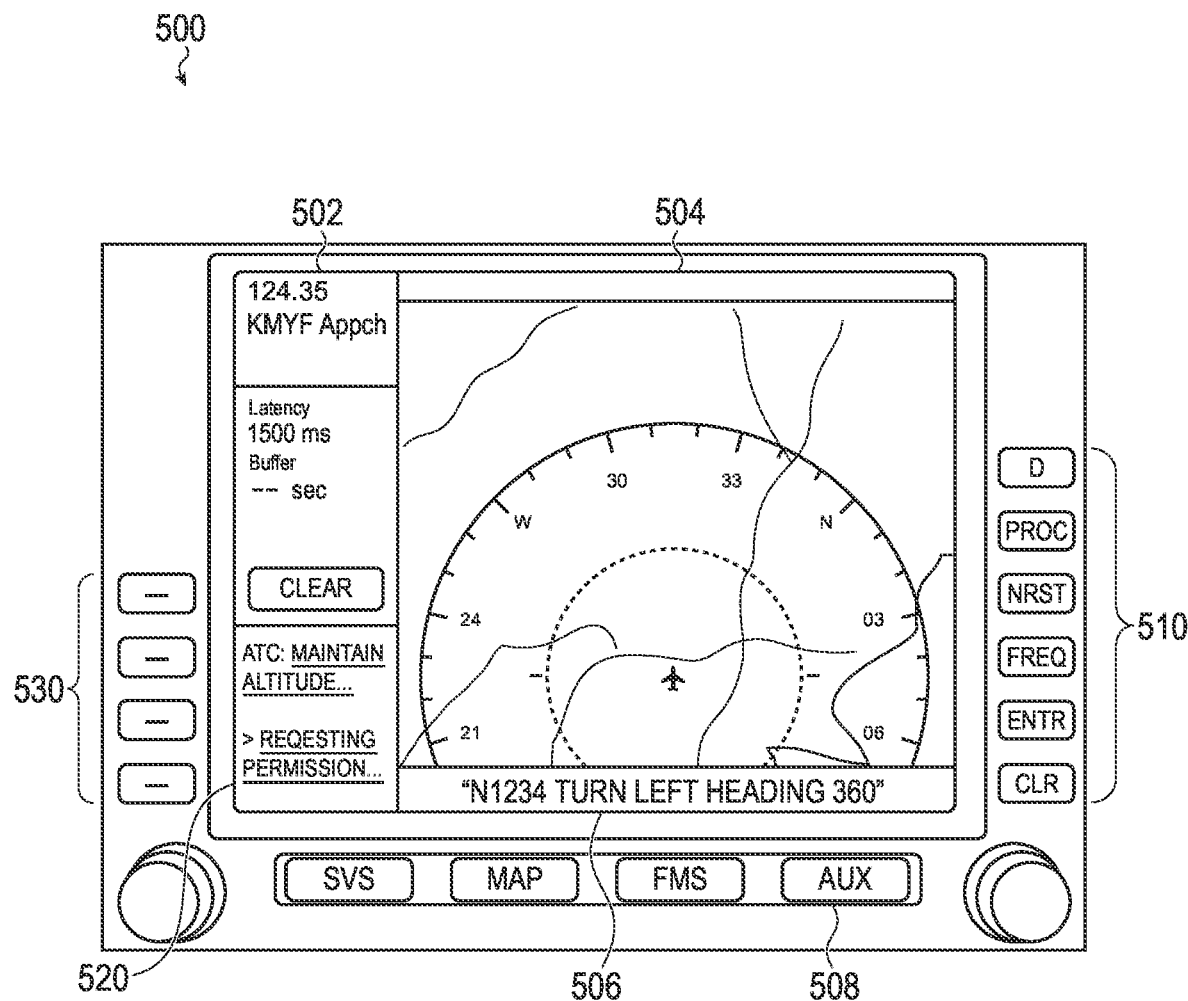
FIG. 5A depicts an example graphical user interface for a terminal device.

FIG. 5A depicts an example graphical user interface (GUI) for a terminal device in accordance with the embodiments described herein. In particular, the interface 500 may be displayed on a display of the terminal device in accordance with an application or program being executed on the device. The interface 500 may be implemented as part of an aircraft control application or program having various interfaces for controlling and monitoring operation of the aircraft. For example, the aircraft control application or program may include or be integrated with an aircraft control interface comprising a set of selectable controls for modifying a control surface of the uncrewed aircraft. The aircraft control application or program may also include or be integrated with an aircraft instrumentation interface comprising a set of instrumentation graphical objects, each instrumentation graphical object configured to display a measured condition experienced by the uncrewed aircraft. In the present example, the aircraft control application or program includes the interface 500, which may also be referred to as a communications interface, and is configured to receive a voice call from an operator and generate the voice communication packet that is communicated to the satellite system.

As shown in FIG. 5A, the interface 500 includes a communication control 502, which includes a region having communication controls and status indicators regarding ATC communications. The communication control 502 may be integrated with the other aircraft controls and aircraft status features shown in FIG. 5A. Alternatively, the communication control 502 may be displayed as part of a separate application or within a dedicated window that may be positioned within the GUI by the remote pilot or other operator. An example of the various functions and operations that may be performed using the communication control 502 is described below with respect to FIGS. 6A-6H.

Using the communication control 502 and/or other control features provided in the interface 500, the remote pilot or other operator can control various aspects of the system. Primarily, the remote pilot or other operator can use the interface 500 to generate voice communications that may ultimately be transmitted to ATC. In one example implementation, the remote terminal includes a push-to-talk microphone device that is operably coupled to the processing unit of the remote terminal via audio input circuitry. The microphone device may include a button or input device that can be pressed and held in order to generate a pilot communication. The microphone control may be implemented using a console button, switch, foot pedal, or other similar device. In some instances, the microphone control is integrated in the interface 500 and may be operated in response to a touch input (for touch-sensitive devices) or cursor control, such as a mouse or trackpad. The microphone control button may also be used to provide other commands to the system in accordance with an input sequence. For example, pressing the microphone control three times (or providing some other predetermined sequence) may cause the system to cancel the current communication and/or clear any buffered audio. Other similar commands may be input using the microphone control, including the automatic triggering of prerecorded messages, entering a record and hold message mode, or provide other system functionality.

The interface 500 may also enable and control the operation of a speaker or other output device of the terminal device. Generally, the terminal device includes a speaker or other output device that is used to produce output in response to voice communications received over the RF-communication channel. The application or program providing the interface 500 may selectively mute or suppress output of messages depending on the state of the system or in response to user interaction with the interface 500. For example, the output corresponding to inbound messages may be muted, suppressed, or delayed for a period in which the remote pilot or other operator is recording or otherwise generating a voice communication. In response to the terminal device detecting a voice input on the microphone device, the terminal device may delay an output of any inbound communications until the voice input is complete. In some cases, the terminal device is configured to automatically convert inbound messages to text (via controls 530) in response to use of the microphone device or in response to other activity on the system including various interactions with the interface 500.

The interface 500, more generally, may be used to monitor and control various aspects of the remote aircraft. As shown in FIG. 5A, the interface 500 includes a monitor region 504, which, in the present example, includes a map or chart view of the region surrounding the aircraft along with orientation indicia and a current waypoint or navigation region 506. In other implementations, the monitor region 504 may include GPS location information, airspeed and heading information, radar information, or other data regarding a current status of the uncrewed aircraft, as detected by one or more on-board sensors or devices. In some cases, the interface 500 may include a region that includes a video feed or image displaying video or images captured by an on-board camera which may be included in the monitor region 504 or separate from the monitor region 504. The interface 500 may also include an instrumentation panel that simulates a portion of the instrumentation panel on the uncrewed aircraft, which may include distinct regions for each instrument including a graphical output that is varied in accordance with instrumentation or sensor readings obtained by the uncrewed aircraft. The instrumentation panel may be integrated with the monitor region 504 or may be displayed in a separate region or window. The control elements 508 may be used to select an item for display in the monitor region 504.

The interface 500 may also provide one or more controls for issuing commands or instructions to the uncrewed aircraft. In the present example, the controls are directed to operation of the on-board radio including radio operational controls 510. Input provided to these controls can be used to modify the operation of the audio hub (item 216 of FIG. 2) on board the uncrewed aircraft. For example, using the operational controls 510, the remote pilot or other operator can select frequency bands and/or power levels used by the uncrewed aircraft for communication with ATC, select one or more predetermined radio settings for operating the audio hub of the uncrewed aircraft, reset the audio hub, or provide other remote commands, which are communicated through the satellite communication system to the on-board computing system that is operably coupled to the audio hub.

In some implementations, the interface 500 also includes text input region 520 which may receive text input from a user through a keyboard or other similar device. The text input region 520 may display input text and include a selectable option for converting the text to voice input and transmitting the voice input as a voice message, in accordance with the embodiments described herein. The text input region 520 may allow for user editing and modification before converting to an audio or voice output. The text input region 520 may also include a region that displays a text generated in response to voice input received from the RF-communication channel via the satellite communication system. Specifically, voice communications received at the terminal device may be converted to text and displayed in a chronological message log format which automatically indexes new messages in response to new messages being received.

The interface 500 may also include controls 530 for managing the voice communications generated at the terminal device. For example, the controls 530, in response to a user selection, may be configured to allow selection from one or more prerecorded messages for transmission on the RF-communication channel. The controls 530 may also be used to manage message buffers or queues, clear buffered or stored messages, or perform other functions for controlling the storing and transmission of voice messages. In some implementations, the controls 530 may also be used to reserve a time window on the RF-communication channel. For example, in response to selection of a respective control of the controls 530, the terminal device may be configured to produce a transmission (reservation transmission) that causes the RF-communication channel to momentarily appear busy or occupied to other aircraft or the ATC facility to keep the channel clear for an outbound voice message. The reservation transmission may be a tone or other audio signal that can be heard by the other operators on the RF-communication channel. In some cases, the reservation transmission may be an inaudible transmission that is detectable by the RF-radio operating hardware used by the ATC and other pilots using the RF-communication channel. In some cases, selection of the respective control will automatically cause a queued or buffered message to be broadcast on the RF-communication channel.

Figure 5B:
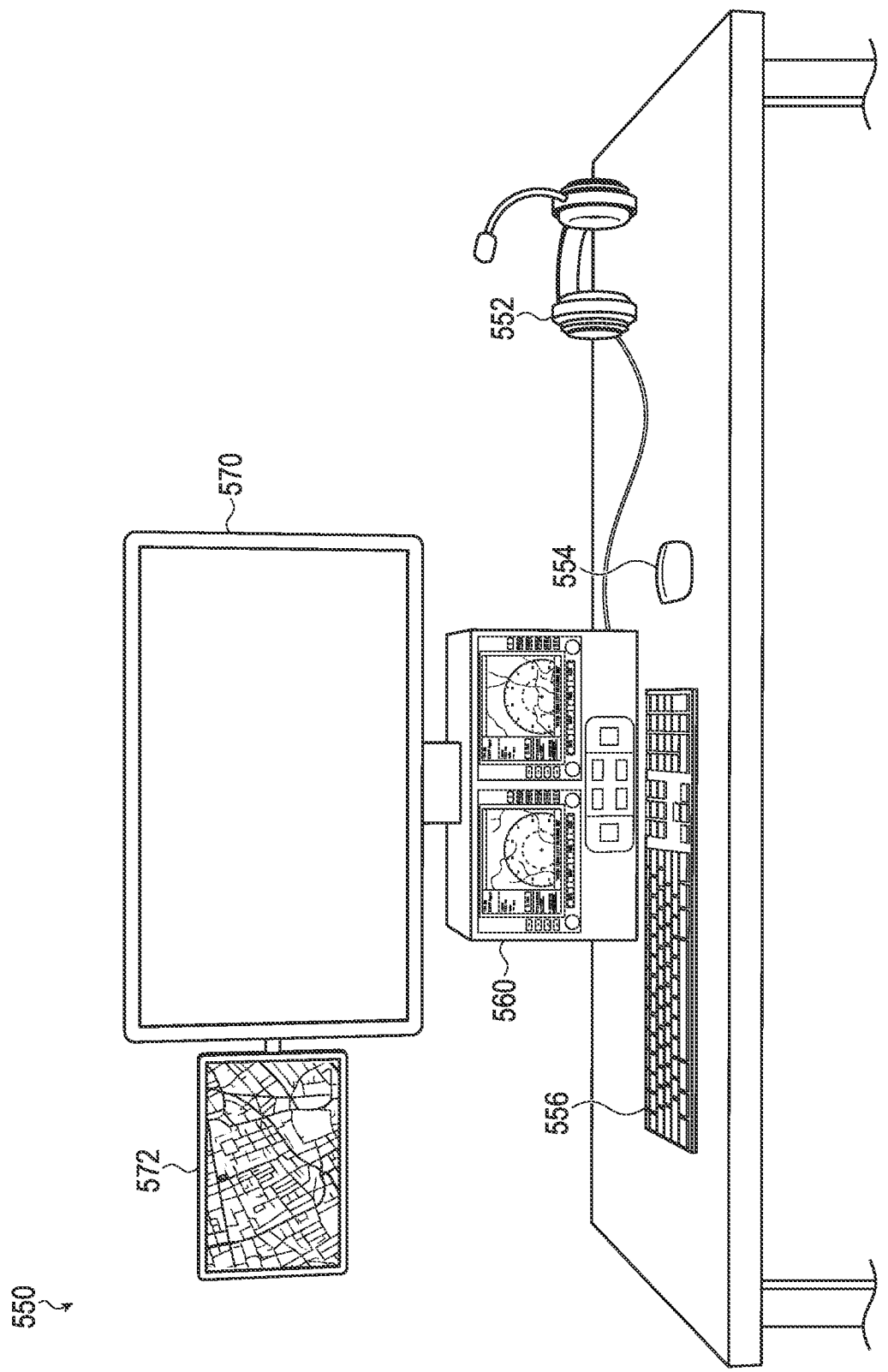
FIG. 5B depicts an example terminal device or system that may be used to display an graphical user interface.

FIG. 5B depicts an example terminal device 550 in accordance with the present disclosure. The terminal device 550 is referred to as a device while acknowledging that the terminal device 550 may include several distinct devices and components. The terminal device 550 may be adapted to perform the operations and functions described herein. Specifically, the terminal device 550 may be used to display a communication interface similar to the example provided above with respect to FIG. 5A.

As shown in FIG. 5B, the terminal device 550 includes an integrated module 560, which includes one or more touchscreen displays. The integrated module 560 may also include one or more hardware switches or controls that may be adapted to perform one or more of the functions described herein. As shown in FIG. 5B, the integrated module 560 also includes a series of bezel controls that are arranged around a perimeter of a respective display. The bezel controls may provide dedicated operations or functionality or may be programed or adapted to perform one or more of the functions described herein.

The integrated module 560 may be used to display a communication interface (e.g., communication interface 500 of FIG. 5A), an aircraft control interface, and aircraft instrumentation interface, or other interface used to facilitate remote operation and/or monitoring of an uncrewed aircraft. As described previously, an aircraft control interface may include a set of selectable controls for modifying a control surface of the uncrewed aircraft. The selectable controls may be implemented as hardware controls or graphical user interface controls. The integrated module 560 may also display an aircraft instrumentation interface, which may include a set of instrumentation graphical objects, each instrumentation graphical object configured to display a sensor output of one or more sensors of the uncrewed aircraft.

The terminal device 550 may also include a display 570 and tablet device 572, which may also display a portion of any of the previously described interfaces (e.g., communication interface, aircraft control interface, or aircraft instrumentation interface). The terminal device may also include a computer processing, computer memory, and other hardware elements described in more detail below with respect to FIG. 7. The terminal device 550 also includes input devices like the keyboard 556 and mouse 554. The terminal device 550 also includes audio components including a headset 552 or other type of microphone, speaker, or other audio device.

FIGS. 6A-6H depict operation of an example graphical user interface in accordance with the embodiments described herein. Specifically, FIGS. 6A-6H depict a communication control window or region that may correspond to the communication control 502 of FIG. 5A and may be used to monitor and control messages transmitted by the system. The following examples are illustrative in nature and the arrangement or operation of the various aspects of the communication control interfaces may vary depending on the implementation.

Figure 6A:
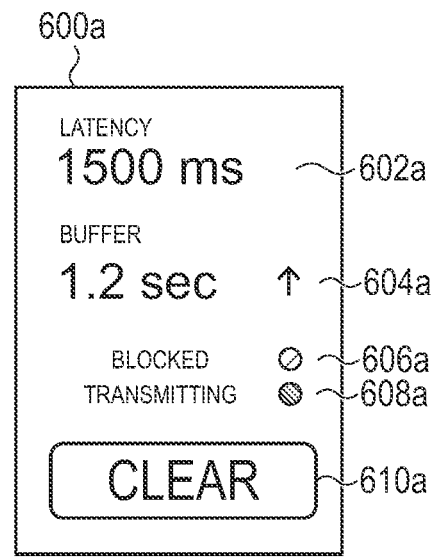
FIGS. 6A-6H depict example graphical user interfaces for a terminal device.

FIG. 6A depicts an example control interface 600a which provides a status regarding the current state of the system and includes selectable controls for controlling the operation of the system. Specifically, the control interface 600a includes a first status region 602a that displays an estimated current latency of the system, which may also be referred to as a latency indicia. In some implementations, the latency indicia includes a numerical value that corresponds to an estimated communication latency between the terminal device and the uncrewed aircraft. The numerical value presented on the first status region 602a may be computed using timestamps of voice communication packets transmitted to and received from the satellite communication system. In some cases, the estimated latency is computed based on an average or other aggregate measurement of measured times from initiation of a message until broadcast on the RF-communication channel. In some cases, the estimated latency includes measured times for return messages that are received on the RF-communication channel and relayed to the terminal device via the satellite communication system. In some cases, the latency is rounded to the nearest 100 msec. The estimated latency may also be computed as a running average based on a set of recent communications relayed through the satellite communication system The example control interface 600a also includes a second status region 604a that includes a value estimating the duration or amount of buffered or stored messages that have yet to be transmitted over the RF-communication channel. As discussed previously, the system will buffer or temporarily store messages if the RF-communication channel is busy or unavailable. In some cases, the messages are stored at the on-board computing system located on the uncrewed aircraft. In addition or alternatively, all or a portion of the messages may be stored by the terminal device. The second status region 604a may include an estimated buffer that includes the estimated length of audio stored either at the uncrewed aircraft, at the terminal device, or a combination of both.

In some implementations, the system allows for multiple messages to be stored or buffered in a message stack. For example, the remote pilot or other operator may provide multiple voice messages either through the microphone, text-to-voice, prestored audio, or other audio source. The system may be configured to cause transmission of each message in the stack in accordance with a determination that the RF-communication channel has been determined to be open or free. The system may introduce a predefined delay between subsequent messages to allow for a natural separation between transmissions and/or to allow other operators or ATC to interject or otherwise use the shared RF-communication channel. In some cases, the delay between stacked or queued messages is 500 msec or longer, 1000 msec or longer, 1500 msec or longer, or another predetermined time period. In some cases, subsequent queued or buffered messages may be further delayed in response to an intervening message from ATC or other pilot using the shared RF-communication channel. In some implementations, messages may be assigned a priority, which may be used by the system to advance a message with a priority status (or having a higher priority status) ahead of other messages that do not have a priority status (or have a lower priority status). In some cases, the management of the message priority is handled by the computing system on board the uncrewed aircraft. Alternatively, the terminal device may alter the sequence of messages in accordance with message priority prior to transmitting the messages to the uncrewed aircraft. In some cases, which system manages the priority depends on where the messages are currently being buffered or stored.

The example control interface 600a also includes status indicia or indicator lights 606a, 608a. Generally, the status indicia 606a, 608a may include a region that changes visual appearance when "lit." For example, a graphical element may be displayed or a displayed graphical element may change color and/or shape in response to being lit or activated. In the current example, the status indicia 606a, 608a are visual indicators. However, the system may also be configured to produce audio output in addition to the visual indicators or instead of the visual indicators. Thus, the following description may also apply to distinct audio tones or other audio output that may be produced in response to the various operational states or conditions of the system.

The first status indicia 606a indicates that a channel is blocked. The first status indicia 606a may be activated or lit in response to the press-to-talk microphone being pressed while the RF-communication channel is predicted to be busy or have an active communication being broadcast. The first status indica 606a may also be activated in response to any input received at the microphone during a time when the RF-communication channel is predicted to be busy. Due to the inherent delays in the system, the first indicia 606a may not reflect the actual current state of the RF-communication channel and may be based on a locally stored state variable that is updated in response to feedback or recent data feeds received from the uncrewed aircraft.

The status indica 608a may be activated or lit in response to an active transmission being processed by the system. In some cases, the status indicia 608a is activated in coordination or tandem with a message generated at the terminal device being actively broadcast over the RF-communication channel. Due to the inherent time delay between the terminal device and the uncrewed aircraft, the transmitting indicator 608a may be activated on a time delay rather than in response to a detected transmission. In some implementations, the time delay is computed based on the estimated latency indicated in the first status region 602a.

The control interface 600a may also include one or more selectable control elements (e.g., virtual buttons). In the current example depicted in FIG. 6A, the control interface includes a selectable control 610a that is operable for clearing the message buffer. In response to a user selection of the control 610a, any pending or un-transmitted messages that are buffered or stored by the system are cleared from memory. The control interface 600a, in other implementations, may include other controls including, for example, a reserve line control that can be used to reserve the RF-communication channel for a period of time, a push-to-talk control that can be used to record or generate voice messages, or a preselect control that can be used to transmit prerecorded messages or signals. Other controls and/or system status elements may also be displayed depending on the implementation.

FIGS. 6B-6H depict different states of the example control interfaces as the system may be used. The operations referenced in FIGS. 6B-6H may correspond to operations and functionality described with respect to other examples described herein.

Figure 6B:
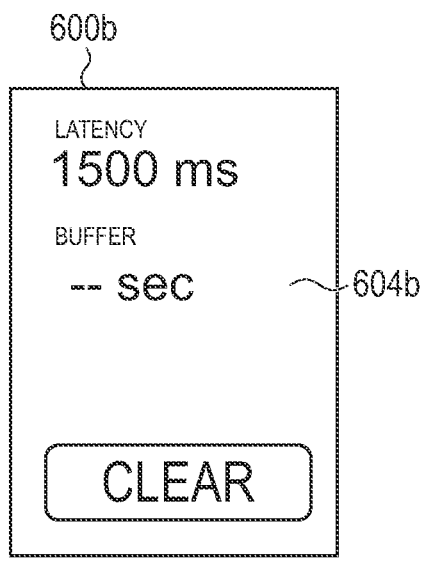

FIG. 6B depicts an example control interface 600b, which may correspond to a default or standby state of the system. In the control interface 600b, the buffer is disabled or empty and display of the indicia is suppressed. In the default or standby state, the system latency may be updated in accordance with test or ping communications that are relayed to the uncrewed aircraft via the satellite communication system. Alternatively, the system latency may remain static and, thus, may represent the latency observed or estimated during the most recent transmission.

Figure 6C:
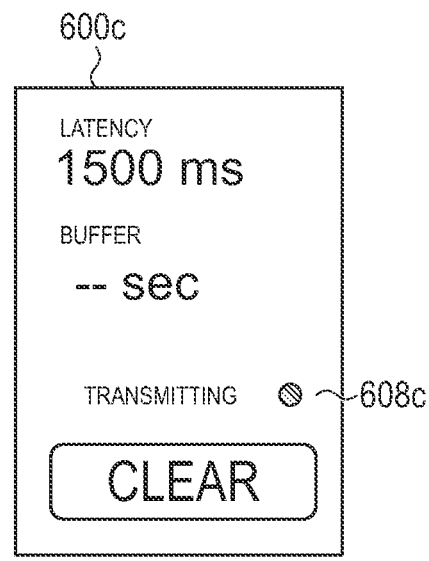

FIG. 6C depicts an example control interface 600c, which may correspond to a state of the system in which a message generated at the terminal device reaches the uncrewed aircraft and the RF-communication channel is clear. This state may correspond to operation 408 of FIG. 4. As shown in FIG. 6C, the status indica 606c is activated indicating that the message is being transmitted on the RF-communication channel. Note that there is no buffered message and the display of the message-blocked indicia is suppressed.

Figure 6D:
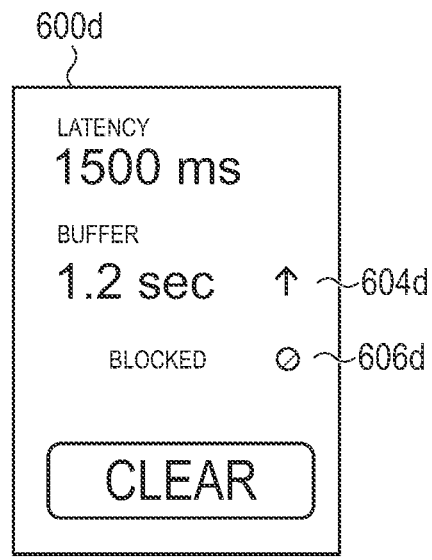

FIG. 6D depicts an example control interface 600d, which may correspond to a state of the system in which a message generated at the terminal device reaches the uncrewed aircraft when the RF-communication channel is busy or currently transmitting a message from ATC or another pilot on the shared channel. This state may correspond to operations 410 and 412 of FIG. 4. As shown in FIG. 6D, the status indicator 606d is activated indicating that the RF-communication channel is busy and transmission of the message is blocked or delayed. Also note that the status region 604d indicates a current buffer amount (e.g., 1.2 sec) and a direction indicia indicating that the buffer is increasing.

Figure 6E:
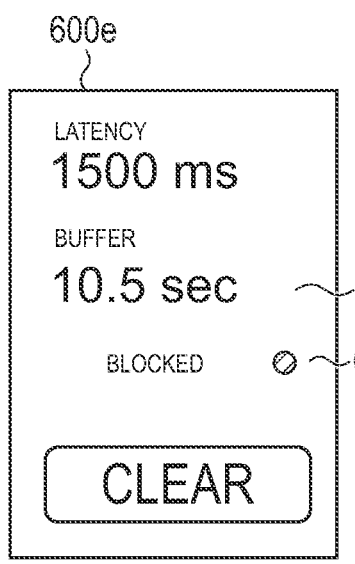

FIG. 6E depicts an example control interface 600e, which may correspond to a state of the system in which the message generated at the terminal device continues to be generated (or has been recently completed) and the RF-communication channel remains busy or currently transmitting a message from ATC or another pilot on the shared channel. This state may correspond to operation 412 of FIG. 4. As shown in FIG. 6E, the status indicator 608e is activated indicating that the RF-communication channel is busy and transmission of the message remains blocked or delayed. Also note that the status region 604e indicates a current buffer amount (e.g., 10.5 sec). If the message has been completed by an operator of the terminal device, the previously displayed buffer-direction indicia may be suppressed indicating that the buffer is neither increasing or decreasing.

Figure 6F:
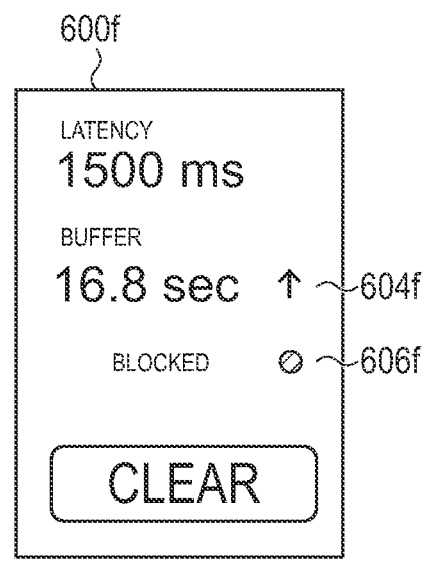

FIG. 6F depicts an example control interface 600f, which may correspond to a state of the system in which the remote pilot or other operator begins to record or generate a second or subsequent voice message while the RF-communication channel remains busy or currently transmitting a message. As shown in FIG. 6F, the status indicator 608f is activated indicating that the RF-communication channel is busy and transmission of the message remains blocked or delayed. Also note that the status region 604f indicates a current buffer amount (e.g., 16.8 sec) and the buffer-direction indicia indicates that the buffer is increasing due to the continued blocked channel and additional voice input being received.

Figure 6G:
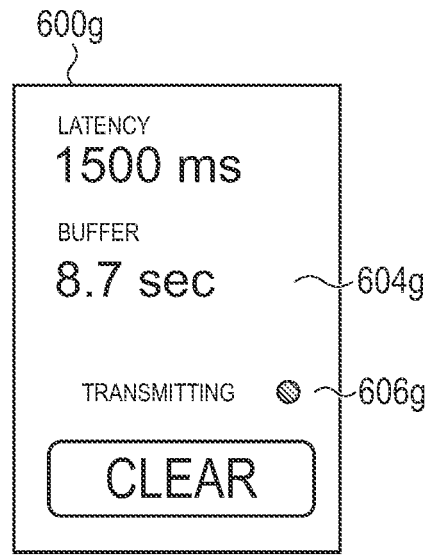

FIG. 6G depicts an example control interface 600g, which may correspond to a state of the system in which the RF-communication channel is clear while the remote pilot or other operator continues to generate a voice message. As shown in FIG. 6G, the status indicator 606g indicates that a message is being transmitted on the RF-communication channel. In this state, the status region 604g indicates that the amount of buffer has been reduced (as compared to the buffer of FIG. 6F). However, the display of the buffer-indicia is suppressed, which indicates that the buffer is neither increasing or decreasing (e.g., steady state).

Figure 6H:
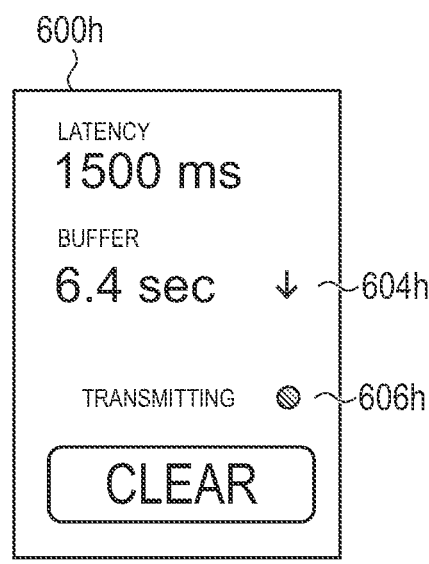

FIG. 6H depicts an example control interface 600h, which may correspond to a state in which the remote pilot or other operator has stopped generating voice message input and the RF-communication channel is clear. As shown in FIG. 6H, the status indicator 606h indicates that a message is being transmitted on the RF-communication channel. Further, the status region 604h indicates that the amount of buffer has been reduced (as compared to the buffer of FIGS. 6F and 6G) and the buffer-direction indicia indicates that the buffer is, in fact, decreasing.

In any of the preceding examples FIGS. 6D-6H in which a stored or buffered message is present, the "clear" control (e.g., control 610a of FIG. 6A) may be used to clear the buffer from memory. Depending on the implementation, selecting the "clear" control may either arrest or cease any current transmission or may allow a current transmission to complete and clear any subsequent buffered or stored messages. Of course, due to latency that may be caused by the satellite communication system, actions executed at the uncrewed aircraft may be delayed with respect to any input or commands provided to the terminal device.

FIG. 7 illustrates a sample electrical block diagram of an electronic device 700 that may perform the operations described herein. The electronic device 700 may in some cases take the form of any of the electronic devices described with reference to FIGS. 1-6H, including any computing systems, client devices, servers, or other computing devices associated with the systems 100 and 200 (e.g., the computing system on board the uncrewed aircraft, the terminal device operated by the remote client, and/or other systems and/or devices for implementing the techniques described herein). The electronic device 700 can include one or more of a display 708, a processing unit 702, a power source 712, a memory 704 or storage device, input devices 706, and output devices 710. In some cases, various implementations of the electronic device 700 may lack some or all of these components and/or include additional or alternative components.

The processing unit 702 can control some or all of the operations of the electronic device 700. The processing unit 702 can communicate, either directly or indirectly, with some or all of the components of the electronic device 700. For example, a system bus or other communication mechanism 714 can provide communication between the processing unit 702, the power source 712, the memory 704, the input device(s) 706, and the output device(s) 710.

The processing unit 702 can be implemented as any electronic device capable of processing, receiving, or transmitting data or instructions. For example, the processing unit 702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., an input device 706) may be controlled by a first processing unit and other components of the electronic device 700 (e.g., the display 708) may be controlled by a second processing unit, where the first and second processing units may or may not be in communication with each other.

The power source 712 can be implemented with any device capable of providing energy to the electronic device 700. For example, the power source 712 may be one or more batteries or rechargeable batteries. Additionally or alternatively, the power source 712 can be a power connector or power cord that connects the electronic device 700 to another power source, such as a wall outlet or a power system of the aircraft.

The memory 704 can store electronic data that can be used by the electronic device 700. For example, the memory 704 can store electronic data or content such as, for example, audio files, video files, voice communication packets, documents and applications, device settings and user preferences, computer instructions, timing signals, control signals, and data structures or databases. The memory 704 can be configured as any type of memory. By way of example only, the memory 704 can be implemented as random access memory, read-only memory, Flash memory, removable memory, other types of storage elements, or combinations of such devices.

In various embodiments, the display 708 provides a graphical output, for example associated with an operating system, user interface, and/or applications of the electronic device 700. For example, the display 708 may display graphical user interfaces associated with the systems 100 and 200, including but not limited to the interface 500 of FIG. 5A, the control interfaces of FIGS. 6A-6H, or any other graphical user interfaces or other graphical outputs described herein). In one embodiment, the display 708 includes one or more sensors and is configured as a touch-sensitive (e.g., single-touch, multi-touch) and/or force-sensitive display to receive inputs from a user. For example, the display 708 may be integrated with a touch sensor (e.g., a capacitive touch sensor) and/or a force sensor to provide a touch- and/or force-sensitive display. The display 708 is operably coupled to the processing unit 702 of the electronic device 700. Additionally or alternatively, the display 708 may include one or more bezel buttons or other input devices that are arranged along the perimeter of the viewable display area.

The display 708 can be implemented with any suitable technology, including, but not limited to, liquid crystal display (LCD) technology, light emitting diode (LED) technology, organic light-emitting display (OLED) technology, organic electroluminescence (OEL) technology, or another type of display technology.

In various embodiments, the input devices 706 may include any suitable components for detecting inputs. As described above with regard to the example terminal device 550 of FIG. 5B, the input device 706 may include a keyboard, mouse, trackpad, or other similar type of input device configured to receive typing, cursor control, or other user input. In some cases, a separate tablet or other portable electronic device may include a touch screen or touch sensor that can be adapted for use as an input device 706 for the device 700. Other examples of input devices 706 include, without limitation, light sensors, temperature sensors, audio sensors (e.g., microphones), optical or visual sensors (e.g., cameras, visible light sensors, or invisible light sensors), proximity sensors, touch sensors, force sensors, mechanical devices (e.g., switches, buttons, or keys), airspeed sensors, altimeters, accelerometers, tilt sensors, radar sensors, LiDAR sensors, vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, or electrodes. Each input device 706 may be configured to detect one or more particular types of input and provide a signal (e.g., an input signal) corresponding to the detected input. The signal may be provided, for example, to the processing unit 702.

As discussed above, in some cases, the input device(s) 706 include a touch sensor (e.g., a capacitive touch sensor) integrated with the display 708 to provide a touch-sensitive display. Similarly, in some cases, the input device(s) 706 include a force sensor (e.g., a capacitive force sensor) integrated with the display 708 to provide a force-sensitive display. Additionally or alternatively, the input device(s) 706 may include a separate trackpad, mouse, tablet, or other device configured to receive touch and/or force input from the user.

The output devices 710 may include any suitable components for providing outputs. Examples of output devices 710 include, without limitation, light emitters, audio output devices (e.g., speakers), visual output devices (e.g., lights or displays), tactile output devices (e.g., haptic output devices), and communication devices (e.g., wired or wireless communication devices). Each output device 710 may be configured to receive one or more signals (e.g., an output signal provided by the processing unit 702) and provide an output corresponding to the signal.

In some cases, input devices 706 and output devices 710 are implemented together as a single device. For example, an input/output device or port can transmit electronic signals via a communications network, such as a wireless and/or wired network connection. Examples of wireless and wired network connections include, but are not limited to, the example communication systems described herein and include, without limitation, satellite communication systems, cellular systems, Wi-Fi, Bluetooth, IR, or Ethernet connections.

The processing unit 702 may be operably coupled to the input devices 706 and the output devices 710. The processing unit 702 may be adapted to exchange signals with the input devices 706 and the output devices 710. For example, the processing unit 702 may receive an input signal from an input device 706 that corresponds to an input detected by the input device 706. The processing unit 702 may interpret the received input signal to determine whether to provide and/or change one or more outputs in response to the input signal. The processing unit 702 may then send an output signal to one or more of the output devices 710, to provide and/or change outputs as appropriate.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer-implemented method for managing communications between a remote pilot at a terminal device operating an uncrewed aircraft and a controller at an air traffic control facility, the method comprising:
   receiving a voice communication packet from a satellite communication system at a first transceiver located at the uncrewed aircraft, the voice communication packet generated at the terminal device located remote from the uncrewed aircraft and transmitted to the satellite communication system;
   in response to receiving the voice communication packet, storing an aircraft-based communication message based on the voice communication packet, the aircraft-based communication message stored in computer memory in the uncrewed aircraft;
   monitoring a voice-communication feed on a radio-frequency (RF) communication channel, the RF-communication channel configured to conduct voice communications between a second transceiver of the uncrewed aircraft, the air traffic control facility, and at least one additional aircraft;
   subsequent to receiving the voice communication packet and in response to detecting an open-channel condition on the RF-communication channel, broadcast an RF transmission on the RF-communication channel using the second transceiver, the RF transmission generated in accordance with the aircraft-based communication message;
   subsequent to receiving the voice communication packet and in response to detecting a current voice communication on the RF-communication channel, suppress transmission of the aircraft-based communication message over the RF-communication channel; and
   subsequent to receiving the voice communication packet and in response to detecting a completion of the current voice communication on the RF-communication channel, broadcast the RF transmission on the RF-communication channel using the second transceiver, the RF transmission generated in accordance with the aircraft-based communication message.

2. The computer-implemented method of claim 1, wherein:
   detecting the completion of the current voice communication comprises:
   receiving a first sample stream of the voice-communication feed at a first time;
   analyzing the first sample stream to determine a first spectral analysis;
   in response to the first spectral analysis satisfying a first criterion corresponding to a detection of a voice pattern or a noise condition, delay a monitoring of the voice-communication feed a predetermined time period; and
   in response to the first spectral analysis satisfying a second criterion corresponding to an open channel condition, detect the completion of the current voice communication on the RF-communication channel.

3. The computer-implemented method of claim 2, wherein:

analyzing the first sample stream is performed by a computing system located on the uncrewed aircraft;

the computing system includes the computer memory storing the aircraft-based communication message;

the computing system is operably coupled to an audio hub by an audio interface; and the audio hub is configured to broadcast the RF transmission using the second transceiver.

4. The computer-implemented method of claim 1, wherein:

the terminal device operated by the remote pilot executes an aircraft control application comprising:

an aircraft control interface comprising a set of selectable controls selectable to modify one or more control surfaces of the uncrewed aircraft;

an aircraft instrumentation interface comprising a set of instrumentation graphical objects, each instrumentation graphical object configured to display a sensor output of one or more sensors of the uncrewed aircraft;

a communications interface configured to receive a voice message from the remote pilot at the terminal device and generate the voice communication packet that is communicated to the satellite communication system; and operations performed at the aircraft control application are received by the uncrewed aircraft via the satellite communication system.

5. The computer-implemented method of claim 1, wherein:

the terminal device operated by the remote pilot executes an aircraft control application having a communications interface;

the communications interface is configured to receive audio input from the remote pilot at the terminal device; and the terminal device is configured to generate the voice communication packet based on the audio input.

6. The computer-implemented method of claim 5, wherein in response to detecting the current voice communication on the RF-communication channel, the communications interface is configured to display an estimated buffer that corresponds to a duration of an un-transmitted portion of the aircraft-based communication message.

7. The computer-implemented method of claim 5, wherein:

in response to detecting the open channel condition on the RF-communication channel, the communications interface is configured to display a status indicia regarding the broadcast of the RF transmission on the RF-communication channel; and the status indicia is displayed for a duration that corresponds to a broadcast duration of the broadcast of the RF transmission.

8. The computer-implemented method of claim 5, wherein:

the communications interface is configured to display a latency indicia; and the latency indicia includes a numerical value that corresponds to an estimated communication latency between the terminal device and the uncrewed aircraft.

9. The computer-implemented method of claim 5, wherein: the audio input is a first voice message;

the aircraft control application is configured to receive a second voice message subsequent to receiving the first voice message;

in response to detecting the current voice communication on the RF-communication channel, the first voice message and the second voice message are stored as buffered messages; and the communications interface is configured to display an estimated buffer that corresponds to a duration of the buffered messages.

10. The computer-implemented method of claim 9, wherein:

the communications interface includes a selectable control; and in response to a user selection of the selectable control, the terminal device is configured to cause the buffered messages to be cleared.

11. The computer-implemented method of claim 9, wherein:

one or more of the first voice message or the second voice message are assigned a priority; and in accordance with either of the first voice message or the second voice message being assigned a higher priority, a respective one of the first voice message or the second voice message is transmitted first.

12. A computer-implemented method for managing communications between a first operator at a terminal device operating an uncrewed aircraft and a second operator in communication with an air traffic control (ATC) facility, the method comprising:

receiving a voice communication packet from a satellite communication system at a first transceiver located at the uncrewed aircraft, the voice communication packet generated at the terminal device and transmitted to the satellite communication system;

in response to receiving the voice communication packet, generate an aircraft-based communication message that is based on the voice communication packet;

monitoring a voice-communication feed on a radio-frequency (RF) communication channel, the RF-communication channel configured to conduct voice communications between a second transceiver of the uncrewed aircraft, the ATC facility, and the second operator;

subsequent to receiving the voice communication packet and in response to detecting a current voice communication on the RF-communication channel, suppress transmission of the aircraft-based communication message over the RF-communication channel; and subsequent to receiving the voice communication packet and in response to detecting a completion of the current voice communication on the RF-communication channel, broadcast an RF transmission on the RF-communication channel using the second transceiver, the RF transmission generated in accordance with the aircraft-based communication message.

13. The computer-implemented method of claim 12, further comprising:

subsequent to receiving the voice communication packet and in response to detecting an open-channel condition on the RF-communication channel, automatically broadcast the RF transmission on the RF-communication channel using the second transceiver.

14. The computer-implemented method of claim 12, wherein:

the terminal device is configured to execute an aircraft control application having a communications interface; and in response to suppressing the transmission of the aircraft-based communication message, the communications interface is configured to display a buffer value indicating a duration of the aircraft-based communication message.

15. The computer-implemented method of claim 14, wherein:
   the voice communication packet is generated in response to a first audio input provided to the communications interface;
   the communications interface is configured to receive multiple subsequent audio inputs; and
   the buffer value displayed by the communications interface corresponds to a duration of any un-broadcast audio input of the first audio input and the multiple subsequent audio inputs.

16. The computer-implemented method of claim 15, wherein the communications interface comprises a control configured to clear any un-broadcast audio input.

17. The computer-implemented method of claim 12, wherein:
   the terminal device is configured to execute an aircraft control application having a communications interface;
   the communications interface is configured to cause generation of the voice communication packet in response to text input at the terminal device; and
   the terminal device is configured to convert the text input to an audio input used to generate the voice communication packet.

18. The computer-implemented method of claim 12, wherein the second operator is a pilot of another aircraft in communication with the ATC facility.

\* \* \* \* \*